US010829070B2

(12) United States Patent
Tyan et al.

(10) Patent No.: US 10,829,070 B2
(45) Date of Patent: Nov. 10, 2020

(54) STRENGTHENING STRUCTURE OF A VEHICLE

(71) Applicant: Ford Global Technologies, LLC, Dearborn, MI (US)

(72) Inventors: Tau Tyan, Northville, MI (US); Wan-San Chiu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 16/145,374

(22) Filed: Sep. 28, 2018

(65) Prior Publication Data

US 2019/0263343 A1 Aug. 29, 2019

Related U.S. Application Data

(63) Continuation-in-part of application No. 15/903,107, filed on Feb. 23, 2018, now Pat. No. 10,562,478.

(51) Int. Cl.
*B60R 19/18* (2006.01)
*B62D 21/15* (2006.01)
*B60R 21/04* (2006.01)
*F16F 7/12* (2006.01)

(52) U.S. Cl.
CPC .............. *B60R 19/18* (2013.01); *B60R 21/04* (2013.01); *B62D 21/15* (2013.01); *F16F 7/12* (2013.01); *B60R 2019/1893* (2013.01); *B60R 2021/0414* (2013.01)

(58) Field of Classification Search
CPC ... B60R 21/04; B60R 2019/264; B60R 19/34; B60R 2021/414; B60R 2021/0442; B60R 2019/1866; F16F 7/121; F16F 7/122; F16F 1/3737; B62D 21/15

USPC ...... 296/39.1, 39.3, 187.03, 187.05; 188/377
See application file for complete search history.

(56) References Cited

U.S. PATENT DOCUMENTS

| | | | |
|---|---|---|---|
| 3,638,992 A | 2/1972 | Forshee | |
| 3,995,901 A * | 12/1976 | Filbert, Jr. | .............. B60R 19/18 293/136 |
| 5,399,406 A * | 3/1995 | Matsuo | ..................... B32B 3/12 428/57 |
| 6,588,830 B1 | 7/2003 | Schmidt et al. | |
| 6,681,907 B2 | 1/2004 | Le | |
| 6,705,653 B2 | 3/2004 | Gotanda et al. | |
| 6,752,451 B2 | 6/2004 | Sakamoto et al. | |
| 7,694,787 B2 | 4/2010 | Kano et al. | |
| 7,926,868 B2 * | 4/2011 | Braunbeck | .............. B60R 19/34 296/187.03 |
| 8,459,726 B2 * | 6/2013 | Tyan | ....................... B60R 19/34 296/133 |

(Continued)

FOREIGN PATENT DOCUMENTS

| | | |
|---|---|---|
| DE | 19603953 C1 | 4/1997 |
| DE | 202016105900 U1 | 3/2017 |
| JP | H11334508 A | 12/1999 |

*Primary Examiner* — Gregory A Blankenship
(74) *Attorney, Agent, or Firm* — David Coppiellie; Price Heneveld LLP

(57) ABSTRACT

A strengthening structure of a vehicle is provided that comprises a base having a first plurality of cutouts and relief members disposed across the base. Each relief member includes a cross section having a plurality of corners forming a plurality of inner and outer angles, a distal end, and an open proximal end in communication with one of the first plurality of cutouts.

11 Claims, 28 Drawing Sheets

(56) References Cited

U.S. PATENT DOCUMENTS

| | | | |
|---|---|---|---|
| 8,539,737 B2 | 9/2013 | Tyan et al. | |
| 8,641,129 B2 | 2/2014 | Tyan et al. | |
| 8,685,299 B2* | 4/2014 | Bobba | B60R 19/18 |
| | | | 264/157 |
| 9,073,582 B2 | 7/2015 | Tyan et al. | |
| 9,174,678 B2 | 11/2015 | Tyan et al. | |
| 9,187,127 B2 | 11/2015 | Tyan et al. | |
| 9,533,710 B2 | 1/2017 | Cheng et al. | |
| 9,840,281 B2 | 12/2017 | Tyan et al. | |
| 9,845,112 B2 | 12/2017 | Tyan et al. | |
| 10,065,682 B1* | 9/2018 | Tyan | B62D 21/15 |
| 10,144,454 B1* | 12/2018 | Tyan | B62D 21/15 |
| 2004/0178662 A1* | 9/2004 | Carroll, III | B60N 2/4249 |
| | | | 296/187.03 |
| 2005/0161982 A1* | 7/2005 | Cormier | A62B 1/22 |
| | | | 296/214 |
| 2005/0212328 A1* | 9/2005 | Ashmead | F16F 7/12 |
| | | | 296/187.05 |
| 2006/0202493 A1* | 9/2006 | Tamura | F16F 7/123 |
| | | | 293/133 |
| 2010/0109353 A1* | 5/2010 | Allen | B60R 19/18 |
| | | | 293/120 |
| 2010/0225136 A1* | 9/2010 | Ogawa | B60J 5/0418 |
| | | | 296/39.1 |
| 2010/0253114 A1 | 10/2010 | Ohmiya et al. | |
| 2011/0221235 A1* | 9/2011 | Tauchi | B60R 21/04 |
| | | | 296/187.05 |
| 2012/0261949 A1* | 10/2012 | Tyan | B60R 19/34 |
| | | | 296/187.03 |
| 2013/0140850 A1* | 6/2013 | Tyan | B21D 5/00 |
| | | | 296/187.03 |
| 2013/0175128 A1* | 7/2013 | Kumar | B60R 19/18 |
| | | | 188/377 |
| 2014/0138984 A1* | 5/2014 | Kwon | B60R 21/04 |
| | | | 296/187.05 |
| 2014/0353990 A1* | 12/2014 | Ishitobi | B60R 19/34 |
| | | | 293/133 |
| 2015/0307049 A1* | 10/2015 | Kwon | B60R 21/04 |
| | | | 188/377 |
| 2016/0076619 A1* | 3/2016 | Cormier | B60R 21/04 |
| | | | 267/140.11 |
| 2016/0082901 A1* | 3/2016 | Bock | B60R 13/0212 |
| | | | 296/187.05 |
| 2016/0375935 A1* | 12/2016 | Tyan | B62D 21/15 |
| | | | 296/205 |
| 2017/0106915 A1 | 4/2017 | Tyan et al. | |
| 2017/0113724 A1* | 4/2017 | Tyan | B62D 21/15 |
| 2017/0203790 A1* | 7/2017 | Tyan | B60R 19/26 |
| 2017/0307137 A1* | 10/2017 | Tyan | B32B 3/12 |
| 2018/0057058 A1* | 3/2018 | Tyan | B62D 21/00 |
| 2018/0057060 A1* | 3/2018 | Tyan | B32B 21/06 |
| 2018/0186323 A1* | 7/2018 | Tallapragada | B60R 21/0428 |
| 2018/0304340 A1* | 10/2018 | Tyan | B21D 47/01 |
| 2019/0063538 A1* | 2/2019 | Audi | B60R 21/04 |
| 2019/0263343 A1* | 8/2019 | Tyan | B60R 19/18 |
| 2019/0263345 A1* | 8/2019 | Tyan | B60R 21/04 |

* cited by examiner

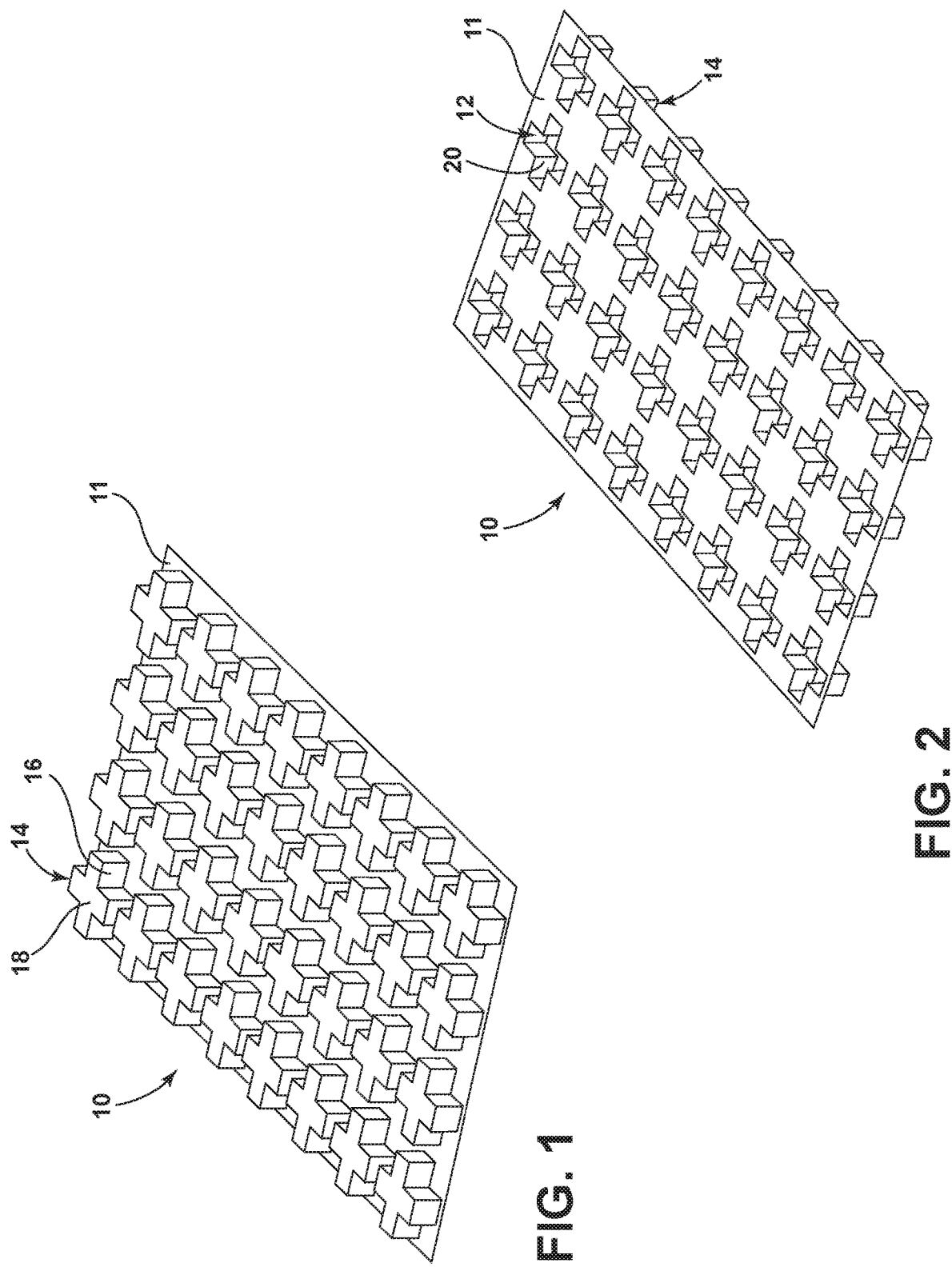

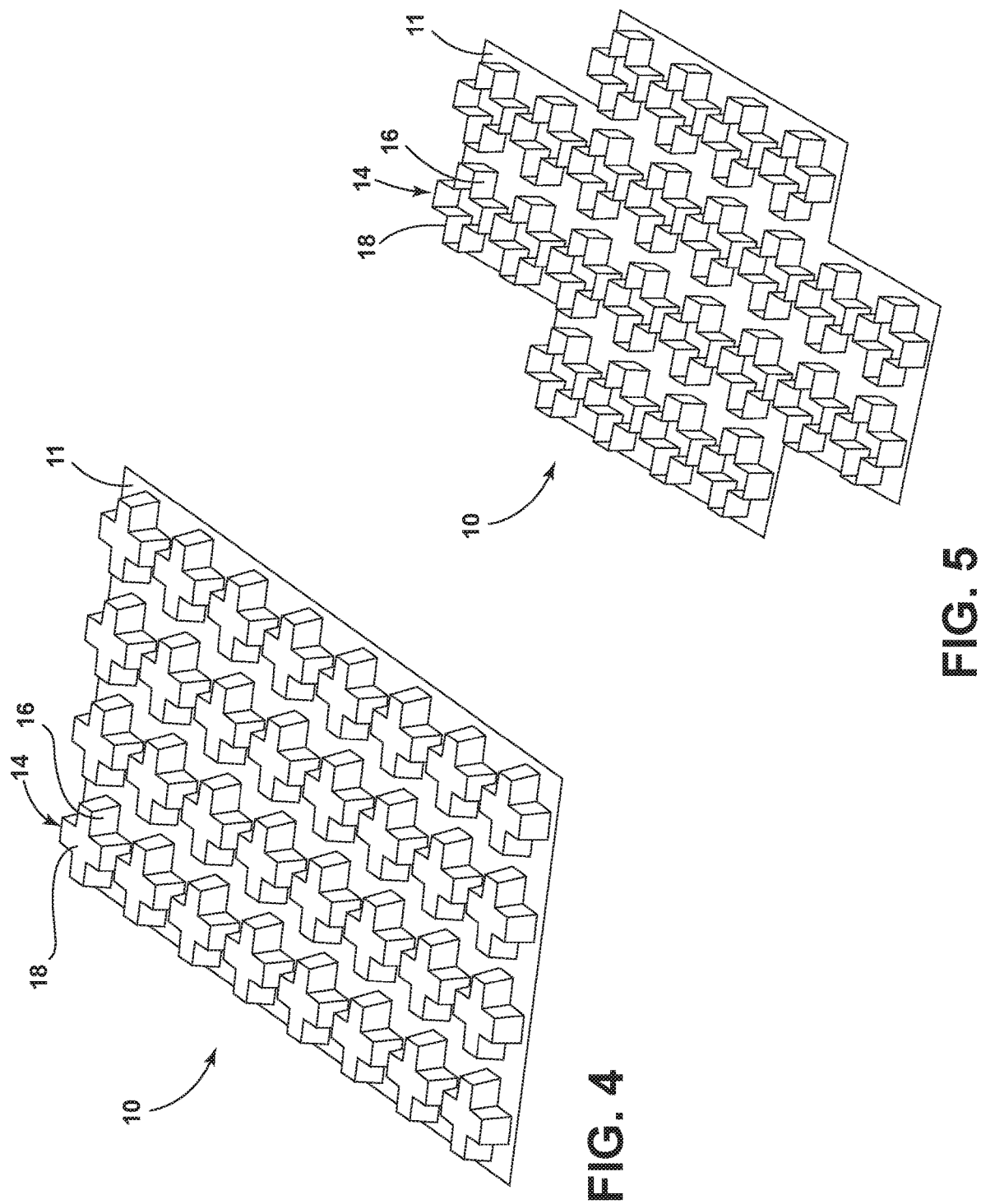

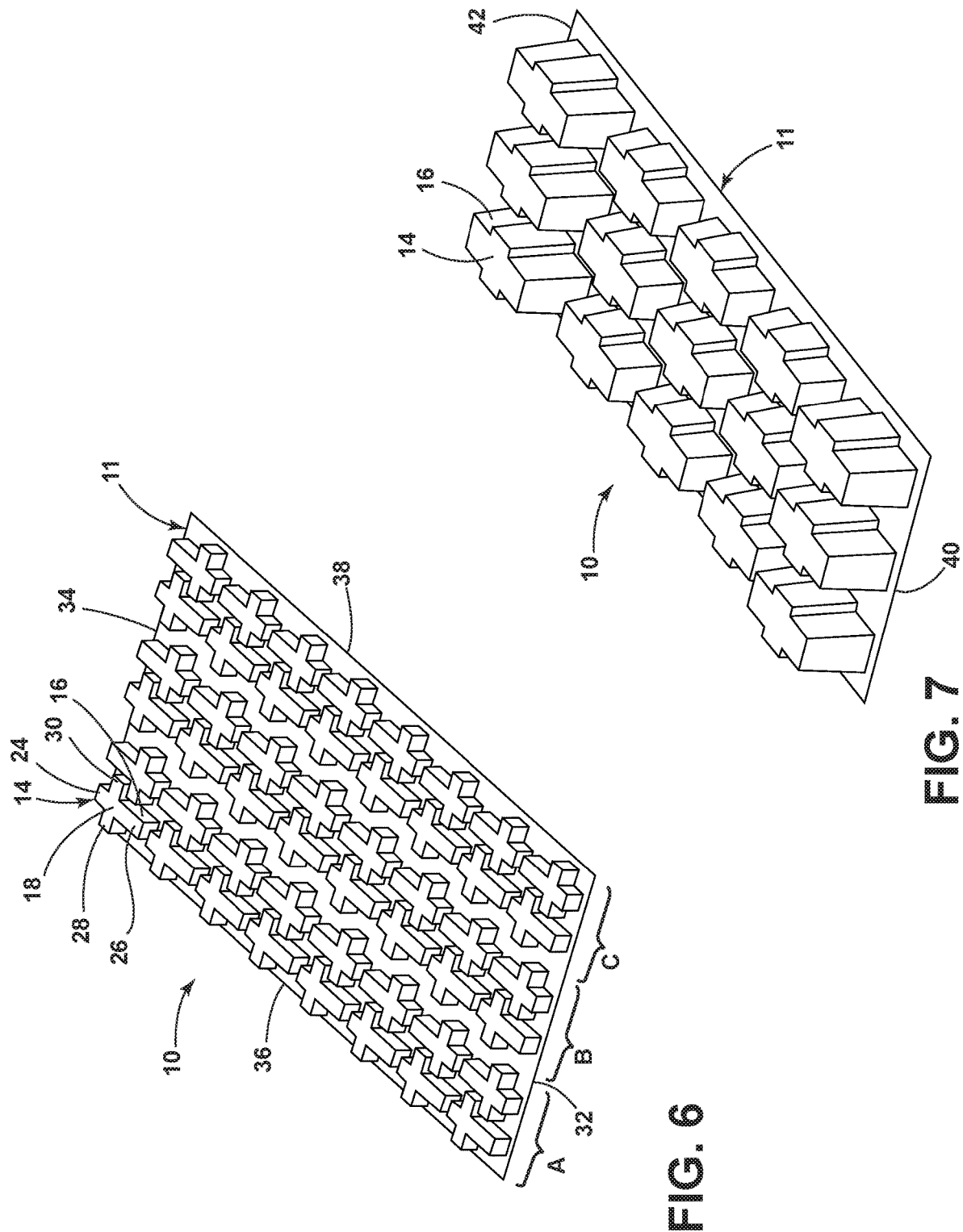

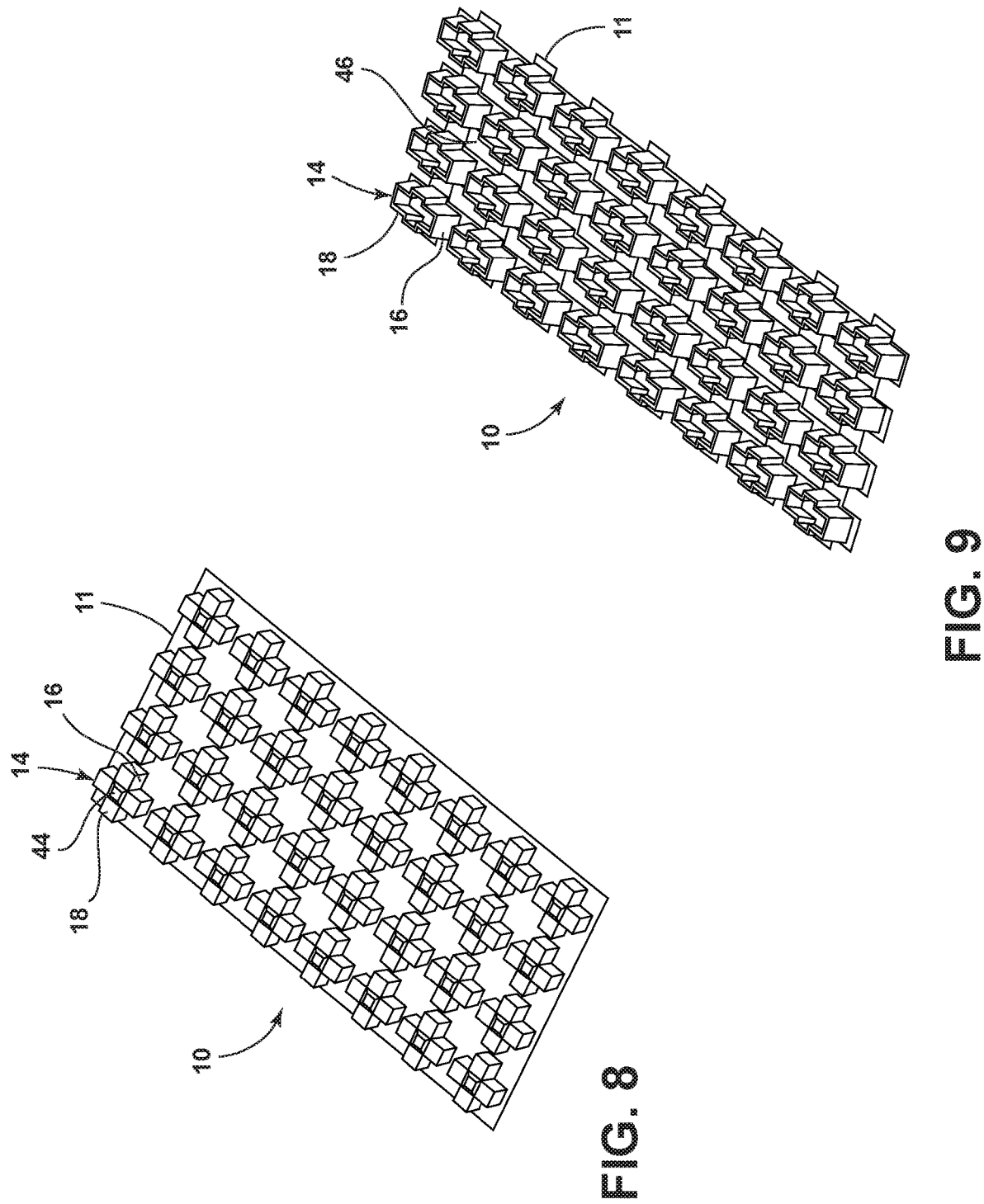

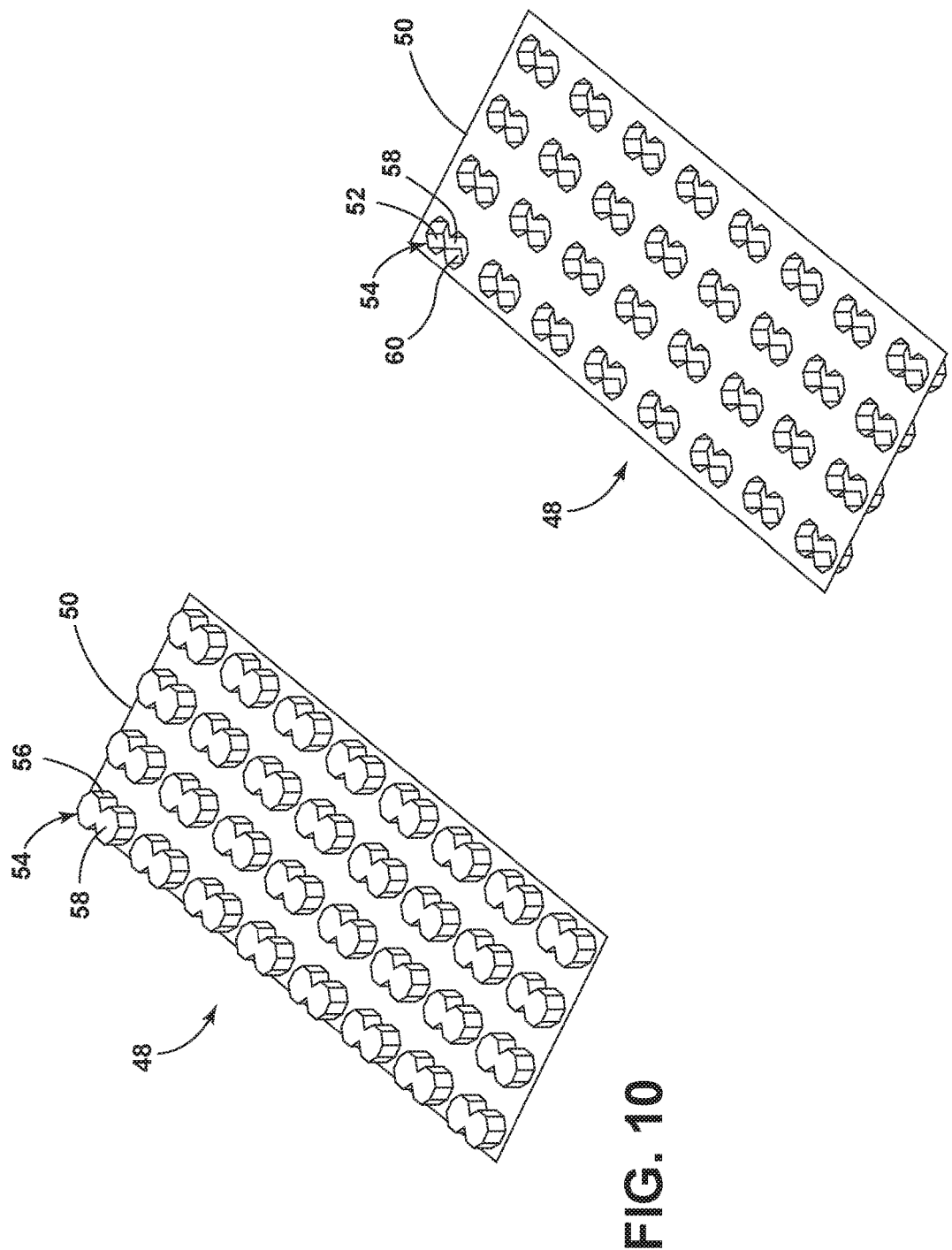

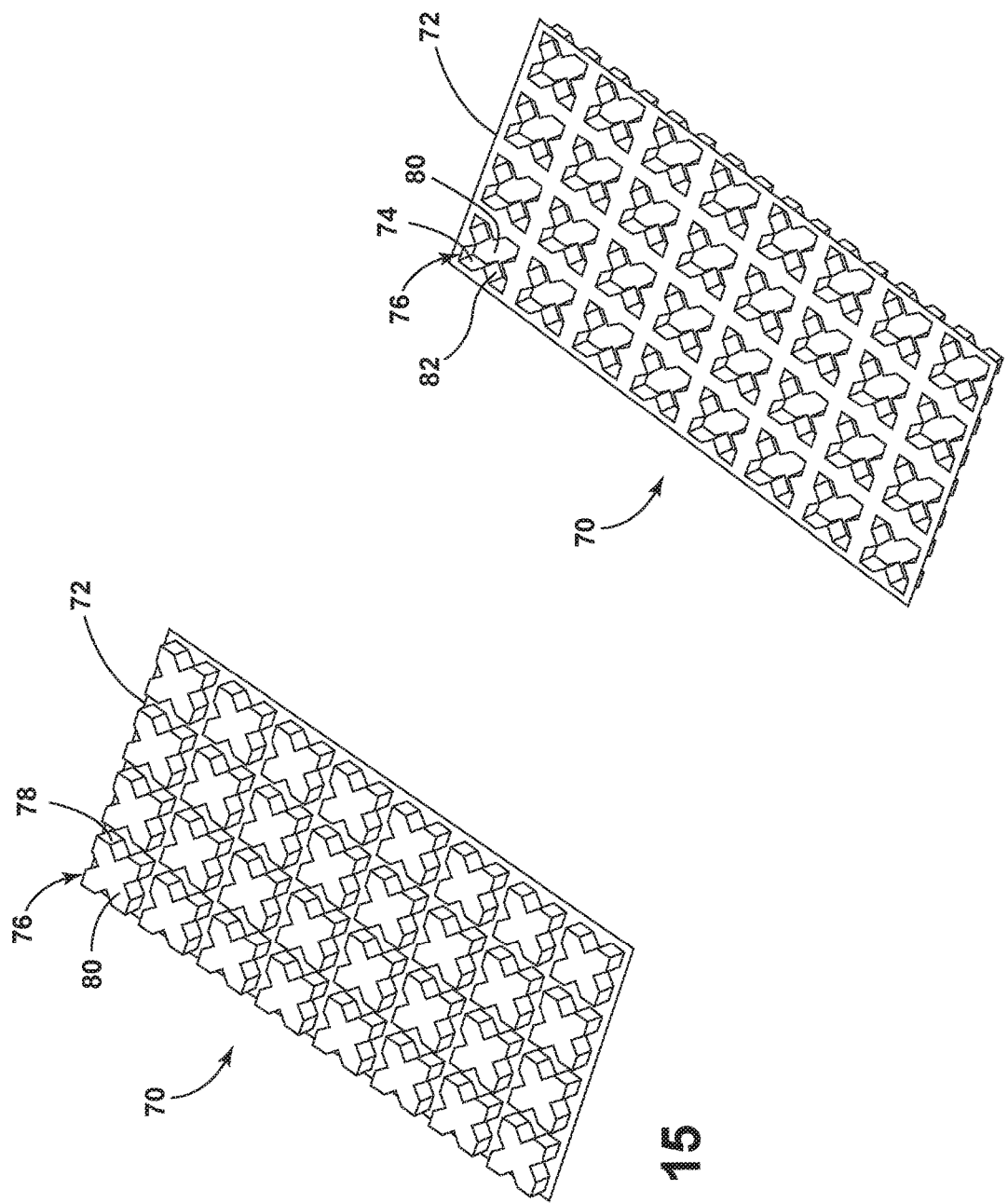

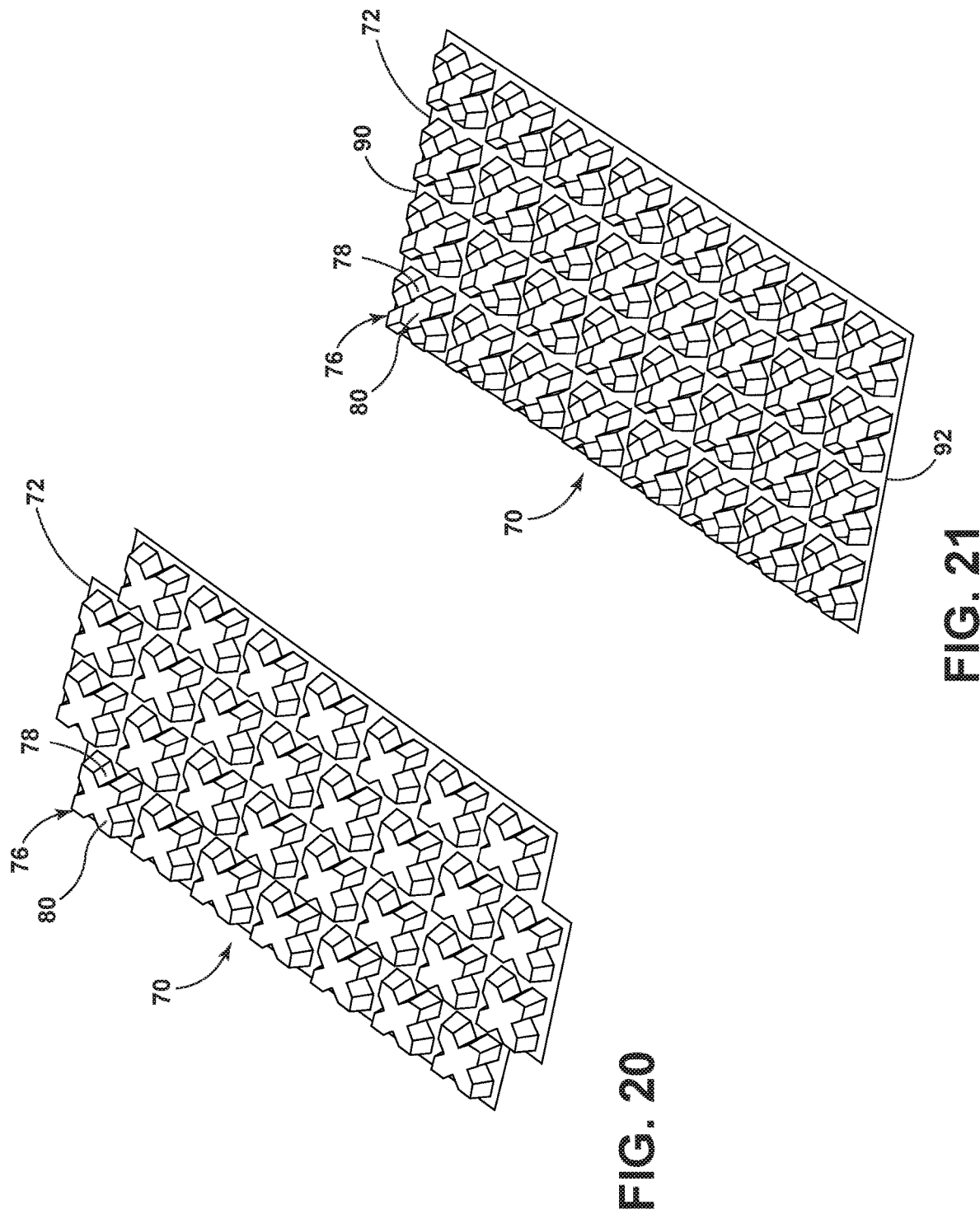

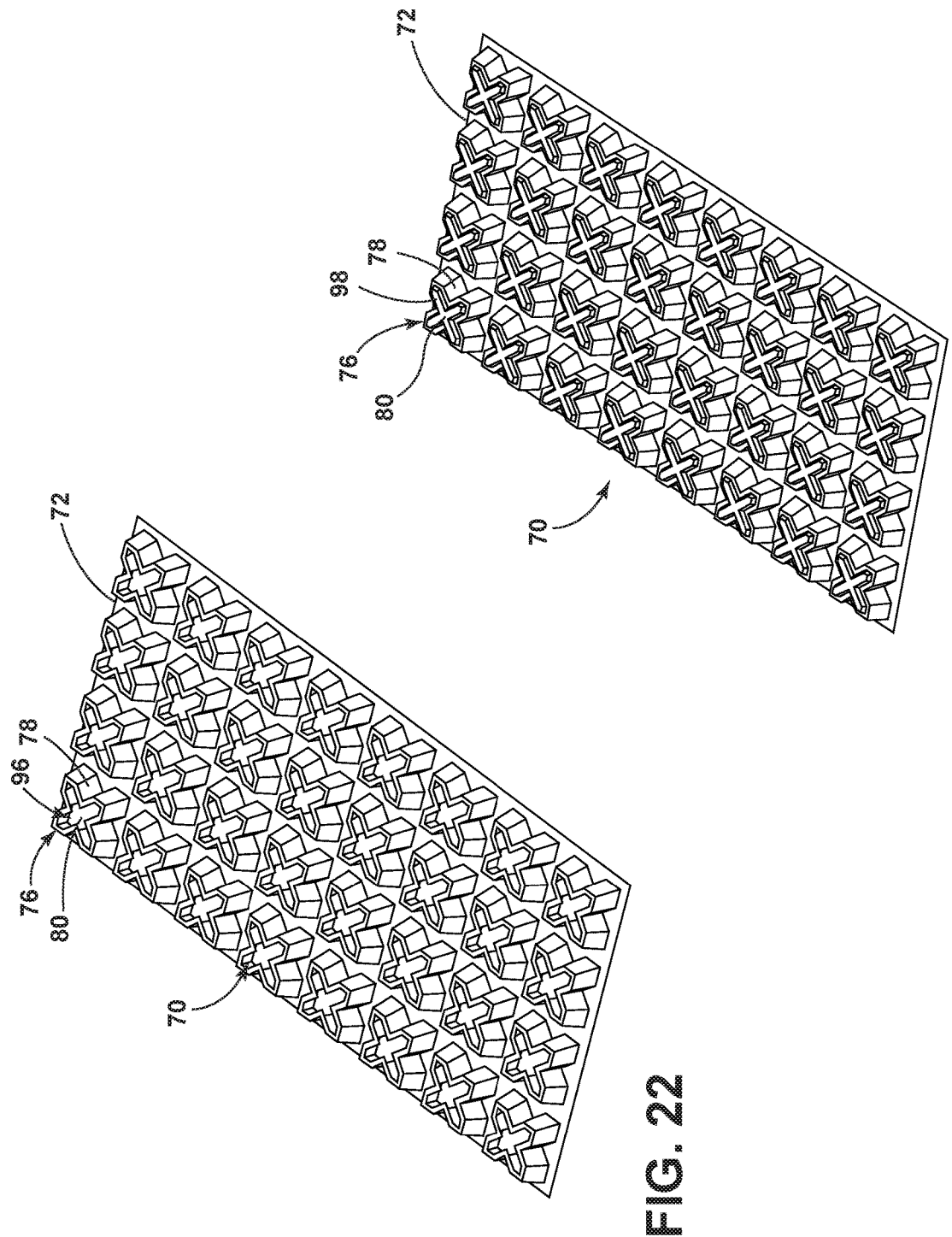

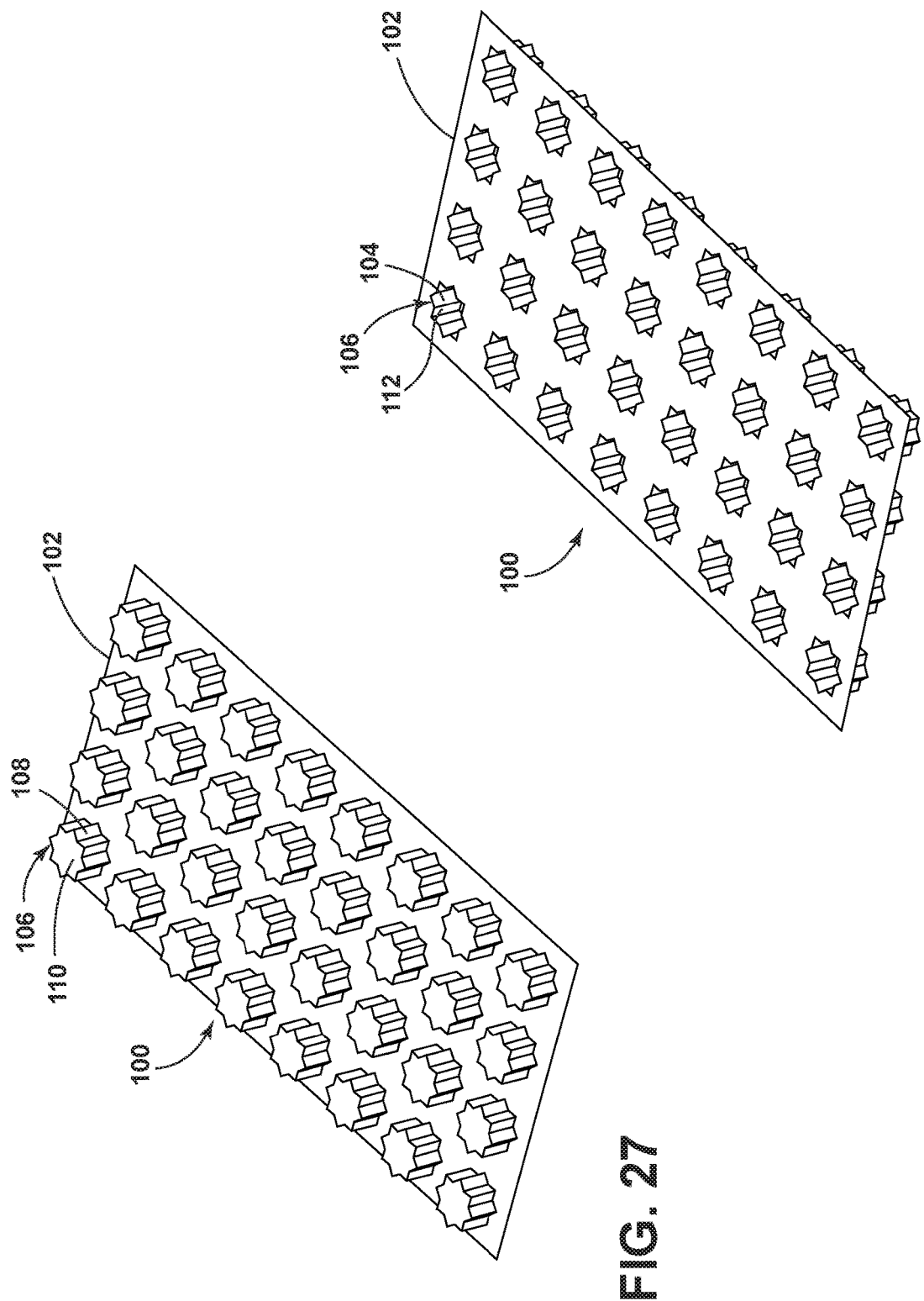

STRENGTHENING STRUCTURE OF A VEHICLE

CROSS-REFERENCE TO RELATED APPLICATION AND CLAIM TO PRIORITY

This application is a continuation-in-part of and claims priority under 35 U.S.C. § 120 to commonly owned, co-pending, related U.S. patent application Ser. No. 15/903,107, filed Feb. 23, 2018, entitled STRENGTHENING STRUCTURE OF A VEHICLE, the entire disclosure of which is incorporated herein by reference.

FIELD OF THE INVENTION

The present disclosure generally relates to a strengthening structure of a vehicle, and more particularly, to a strengthening structure including a plurality of relief members each having a multi-cornered cross section.

BACKGROUND OF THE INVENTION

When a compressive force is exerted on a strengthening structure, one or more relief members can crush in a longitudinal direction to absorb the energy of the collision. It is desirable to provide a strengthening structure with improved strength while minimizing mass per unit length and high manufacturing feasibility. The present disclosure is intended to satisfy this need.

SUMMARY OF THE INVENTION

According to a first aspect of the present disclosure, a strengthening structure of a vehicle is provided and includes a base having cutouts. Relief members are disposed across the base and each include a cross section having a plurality of corners forming a plurality of inner and outer angles, a distal end, and an open proximal end in communication with one of the first plurality of cutouts.

Embodiments of the first aspect of the disclosure can include any one or a combination of the following features:
 the distal end is open;
 the distal end is partially open;
 the distal end includes a raised central portion;
 the relief members have variable height;
 each relief member is tapered;
 the base includes a second plurality of cutouts free from communication with any of the relief members;
 the relief members have at least sixteen-cornered cross sections shaped as a star;
 the relief members have at least sixteen-cornered cross sections shaped as a cross having angular ends;
 the relief members are positioned in offset rows;
 the cross section includes one of sixteen corners, eighteen corners, twenty corners, twenty-two corners, twenty-four corners, twenty-six corners, and twenty-eight corners;
 the cross section of the relief members has up to forty corners;
 the cross section of the relief members has a number of corners within a range of about 3 to about 100; and/or
 the cross section of the relief members includes a plurality of sides of variable lengths and thicknesses.

According to a second aspect of the present disclosure, a strengthening structure of a vehicle is provided and includes a base having a plurality of cutouts. A plurality of relief members of variable heights are disposed across the base. Each of the relief members has one of substantially uniform sides and substantially tapered sides. Each of the relief members includes at least a sixteen-cornered cross section having variable lengths and thicknesses, a distal end, and an open proximal end in communication with one of the plurality of cutouts.

Embodiments of the second aspect of the disclosure can include any one or a combination of the following features:
 the distal end is one of open, partially open, and closed;
 the distal end is closed and includes a raised central portion;
 the cross section includes one of sixteen corners, eighteen corners, twenty corners, twenty-two corners, twenty-four corners, twenty-six corners, and twenty-eight corners; and/or
 the base includes a cutout free from communication with any of the relief members.

According to a third aspect of the present disclosure, a strengthening structure of a vehicle is provided and includes a base having a first plurality of cutouts. A plurality of one of uniform relief members and tapered relief members of variable heights are disposed across the base. Each relief member includes a cross section having about three corners to about forty corners and having a plurality of sides of variable lengths and thicknesses, a distal end, and an open proximal end in communication with a corresponding cutout.

Embodiments of the third aspect of the disclosure can include any one or a combination of the following features:
 the distal end is open, partially open, or closed;
 the distal end is closed and includes a raised central portion; and/or
 the base includes cutouts free from communication with any of the relief members.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a top perspective view of one embodiment of a strengthening structure with relief members each having a twelve-cornered cross section;

FIG. 2 is a bottom perspective view of the strengthening structure of FIG. 1;

FIG. 4 illustrates another embodiment of the strengthening structure of FIG. 1 in which the relief members are tapered toward a distal end;

FIG. 5 illustrates another embodiment of the strengthening structure of FIG. 1 in which the relief members each include an open distal end and are coupled to a planar twelve-cornered base;

FIG. 6 illustrates another embodiment of the strengthening structure of FIG. 1 in which the relief members are shaped as crosses;

FIG. 7 illustrates another embodiment of the strengthening structure of FIG. 1 in which the relief members have variable height;

FIG. 8 illustrates another embodiment of the strengthening structure of FIG. 1 in which the relief members each include a closed distal end and a raised central portion;

FIG. 9 illustrates another embodiment of the strengthening structure of FIG. 1 in which the relief members each include a partially open distal end and are coupled to a base having cutouts free from communication with any of the relief members;

FIG. 10 is a top perspective view of an exemplary embodiment of a strengthening structure with relief members each having a fourteen-cornered cross section;

FIG. 11 is a bottom perspective view of the strengthening structure of FIG. 10;

FIG. 15 is a top perspective view of one embodiment of a strengthening structure with relief members each having a sixteen-cornered cross section;

FIG. 16 is a bottom perspective view of the strengthening structure of FIG. 15;

FIG. 20 illustrates another embodiment of the strengthening structure of FIG. 15 in which the relief members are offset;

FIG. 21 illustrates another embodiment of the strengthening structure of FIG. 15 in which the relief members each include an open distal end and are coupled to a planar sixteen-cornered base;

FIG. 22 illustrates another embodiment of the strengthening structure of FIG. 15 in which the relief members each include a partially open distal end and are coupled to a base having cutouts free from communication with any of the relief members FIG. 23 illustrates another embodiment of the strengthening structure of FIG. 15 in which the relief members each include a closed distal end and a raised central portion;

FIG. 27 is a top perspective view of one embodiment of a strengthening structure with relief members each having a sixteen-cornered cross section;

FIG. 28 is a bottom perspective view of the strengthening structure of FIG. 27;

DETAILED DESCRIPTION OF THE PREFERRED EMBODIMENTS

Figure 3:
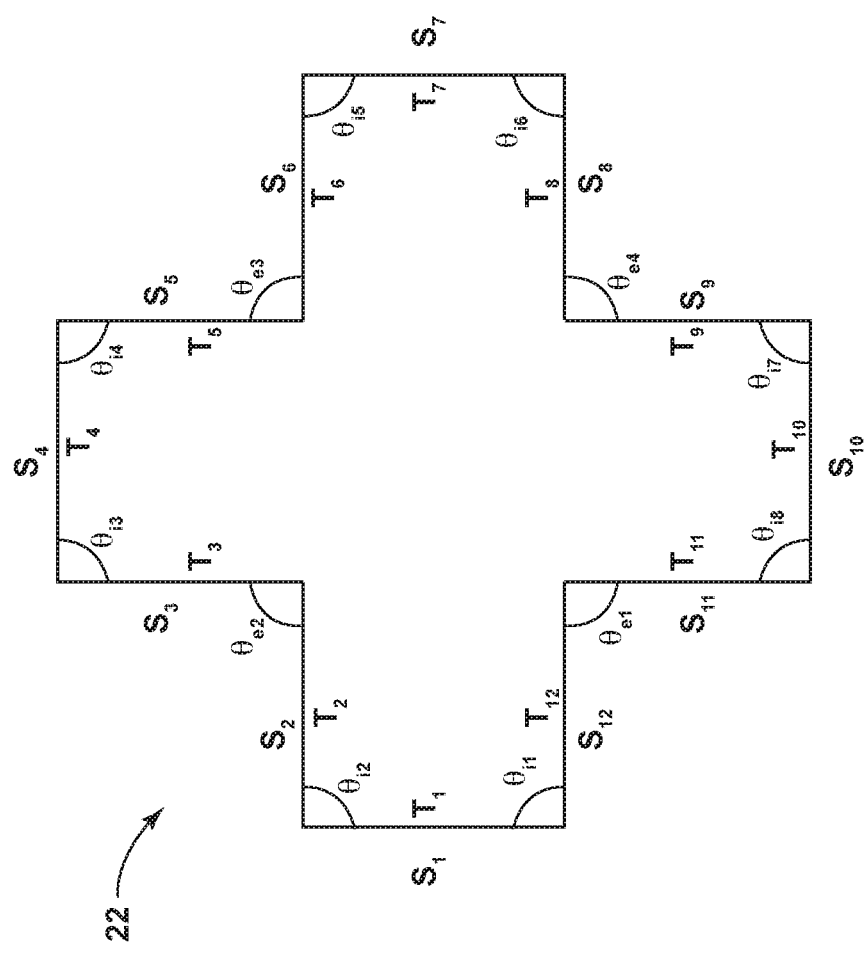
FIG. 3 illustrates a twelve-cornered cross section of a relief member according to the embodiment of FIGS. 1 and 2.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The present disclosure contemplates providing a strengthening structure including a plurality of relief members each having a sidewall with at least a twelve-cornered or fourteen-cornered cross section. The strengthening structure can achieve increased energy absorption and a more stable axial collapse when forces are exerted thereon. The strengthening structure can also possess improved durability and noise-vibration-harshness (NVH) performance due to work hardening on the twelve or fourteen corners. The internal and external angles associated with the at least twelve or fourteen corners can achieve the same strength increase as thickened corners while minimizing mass per unit length and maintaining a high manufacturing feasibility because the structure can be formed by bending, rolling, stamping, pressing, hydro-forming, molding, extrusion, cutting, and forging.

Referring to FIGS. 1-9, a strengthening structure is generally designated by reference numeral 10. The strengthening structure 10 includes a base 11 having a plurality of cutouts 12 and a plurality of relief members 14 extending from the base 11. The base 11 may be planar and each relief member 14 includes a sidewall 16 having a multi-cornered cross section, a distal end 18 that may be closed, open, or partially open, and an open proximal end 20 in communication with a corresponding cutout 12.

Referring to FIGS. 1 and 2, the relief members 14 are evenly spaced across the base 11 and the distal end 18 of each relief member 14 is closed. However, it will be appreciated that the number and spacing of the relief members 14 are exemplary in nature and may be varied if desired. For purposes of understanding, a cross section 22 of the sidewall 16 depicted in FIGS. 1 and 2 is shown in FIG. 3. As illustrated, the cross section 22 has lengths $S_1$-$S_{12}$, thicknesses $T_1$-$T_{12}$, eight internal corners with angles $\theta_{i1}$-$\theta_{i8}$, and four external corners with angles $\theta_{e1}$-$\theta_{e4}$. In certain embodiments, the internal and external angles may have variable bend radii. For example, some corners may appear rounded in instances where relatively large bend radii are selected. In the illustrated embodiment, the lengths $S_1$-$S_{12}$ and thicknesses $T_1$-$T_{12}$ are about the same. The internal and external corners are generally shown as having about the same angle. In certain embodiments, the lengths $S_1$-$S_{12}$, thicknesses $T_1$-$T_{12}$, and/or angles associated with the internal and/or external corners can be varied to a certain degree with available packaging space within a vehicle. For additional design flexibility, it is contemplated that the sidewall 16 may be substantially uniform as shown in FIGS. 1 and 2 or tapered toward the distal end 18 as shown in FIG. 4. In embodiments where the strengthening structure 10 is manufactured using a molding or stamping process, the thicknesses $T_1$-$T_{12}$ of the sidewall 16 may become thinner when moving from the proximal end 20 to the distal end 18. In other manufacturing processes, the thicknesses $T_1$-$T_{12}$ of the sidewall 16 have little to no variation.

Referring to FIGS. 5-9, various embodiments of the strengthening structure 10 are shown and will be described in greater detail herein. For example, in FIG. 5, the base 11 is planar with twelve corners and the distal end 18 of each relief member 14 is open. In FIG. 6, each relief member 14 is cross-shaped and includes a head 24, a tail 26 that is longer than the head 24, and a pair of arms 28, 30 of equal length. The head 24, tail 26, and two arms 28, 30 are defined by corresponding portions of the sidewall 16 and the distal end 18. However, in embodiments where the distal end 18 is open, the head 24, tail 26, and two arms 28, 30 may be defined exclusively by the sidewall 16. As depicted, the relief members 14 are arranged in rows across the base 11 from a first end 32 to a second end 34 such that the heads 24 of the relief members 14 of a same row all point in a common direction. Additionally, the relief members 14 are arranged in rows across the base 11 from a third end 36 to a fourth end 38 such that the heads 24 of the relief members 14 in the same row point in alternating opposite directions. In certain embodiments, the relief members 14 may be arranged in spaced-apart groupings exemplarily shown as groupings A, B, and C. Alternatively, the relief members 14 may be evenly spaced if so desired.

With reference to FIG. 7, the relief members 14 are shown having variable height. For example, relief members 14 located adjacent longitudinal ends 40 and 42 of the base 11 may be taller than the remaining relief members 14. In FIG. 8, the distal end 18 of each relief member 14 is closed and includes a raised central portion 44 to assist in absorbing minor impact while the remaining structure functions to absorb impact that is more severe. In FIG. 9, the distal end 18 of each relief member 14 is partially open. Also, the base 11 includes additional cutouts 46 that are free from communication with any of the relief members 14.

Referring now to FIGS. 10 and 11, an alternative strengthening structure is generally designated by reference numeral 48. The strengthening structure 48 includes a base 50 having a plurality of cutouts 52 and a plurality of relief members 54 extending from the base 50. The base 50 may be planar and each relief member 54 includes a sidewall 56 having a fourteen-cornered cross section, a distal end 58, and an open proximal end 60 in communication with a corresponding cutout 52. It will be understood that the strengthening structure 48 may benefit from some of the design flexibility described herein with respect to strengthening structure 10. That is, the relief members 54 may have variable height and may be variously or evenly spaced across the base 50. Additionally or alternatively, the distal end 58 of each relief member 54 may be closed, open, or partially open. In closed or partially open embodiments, it will be understood that the distal end 58 may include raised portions of varied size and shape. Additionally or alternatively still, the sidewall 56 of each relief member 54 may be uniform or tapered. Additionally or alternatively still, the base 50 may have various shapes and/or include additional cutouts free from communication with any of the relief members 54.

Figure 12:
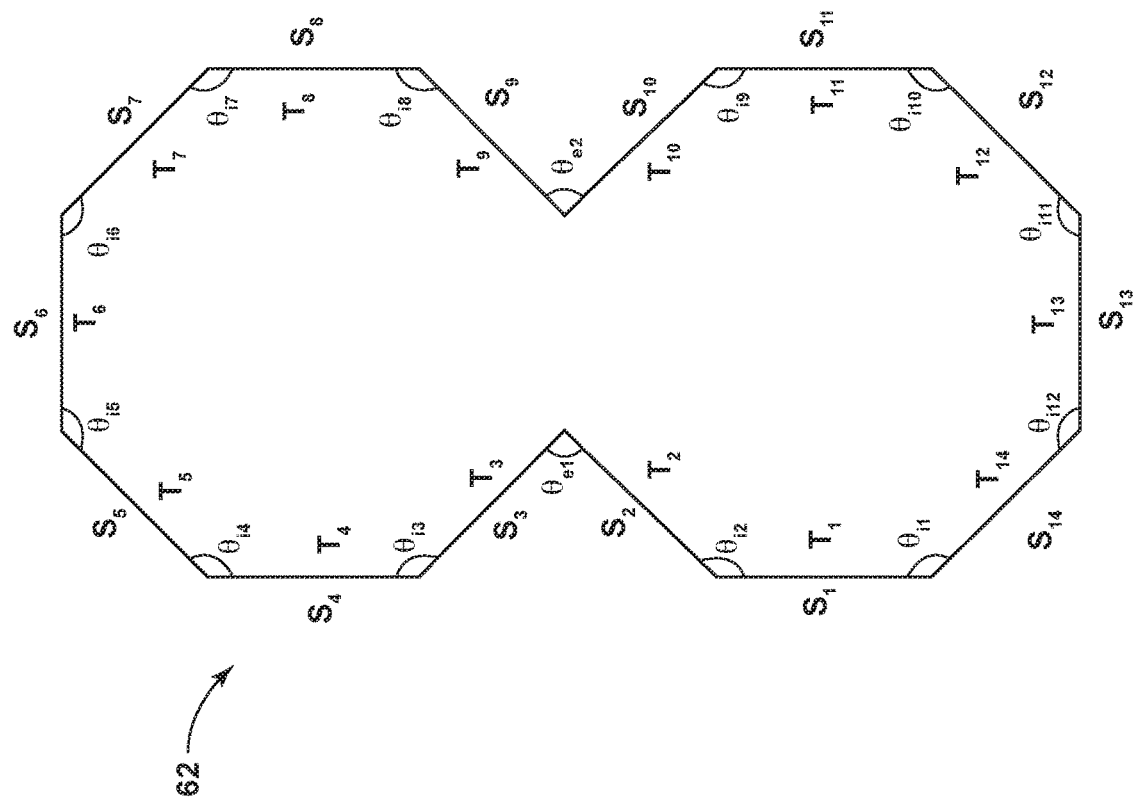
FIG. 12 illustrates a fourteen-cornered cross section of a relief member according to the embodiment of FIGS. 10 and 11.
Figure 13:
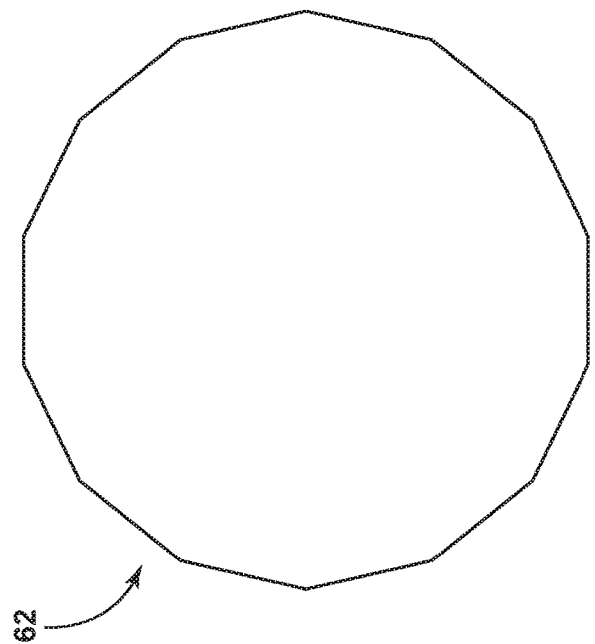
FIG. 13 illustrates a fourteen-cornered cross section in the shape of a fourteenagon.
Figure 14:
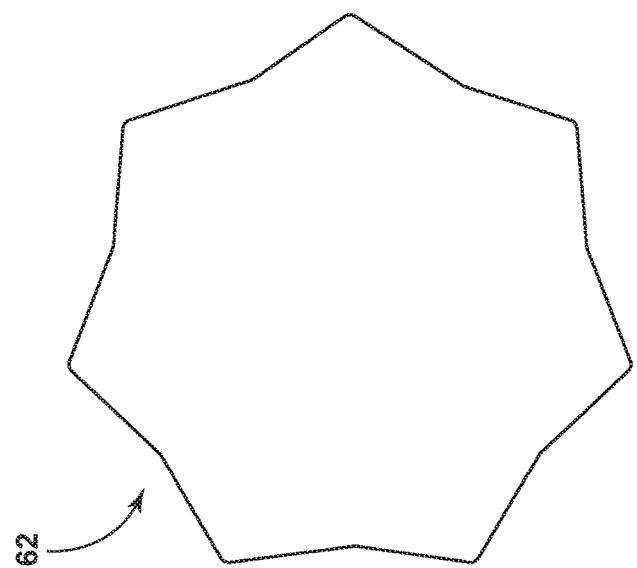
FIG. 14 illustrates a fourteen-cornered cross section in the shape of a star.

For purposes of understanding, a cross section 62 of the sidewall 56 depicted in FIGS. 10 and 11 is shown in FIG. 12. As illustrated, the cross section 62 has lengths $S_1$-$S_{14}$, thicknesses $T_1$-$T_{14}$, twelve internal corners with angles $\theta_{i1}$-$\theta_{i2}$, and two external corners with angles $\theta_{e1}$ and $\theta_{e2}$. In the illustrated embodiment, the lengths $S_1$-$S_{14}$ and thicknesses $T_1$-$T_{14}$ are about the same. Likewise, the angles $\theta_{i1}$-$\theta_{i12}$ associated with the internal corners are about the same and the angles $\theta_{e1}$, $\theta_{e2}$ associated with the external corners are also about the same. In certain embodiments, the lengths $S_1$-$S_{14}$, thicknesses $T_1$-$T_{14}$, and/or angles associated with the internal and/or external corners can be varied to a certain degree with available packaging space within a vehicle. While the cross section 62 is generally shown in FIG. 12 as having an outline of a digital "8," it will be appreciated that other shapes are possible. For example, as shown in FIG. 13, the cross section 62 may be shaped as a fourteenagon. In another example, as shown in FIG. 14, the cross section 62 may be shaped as a star.

Figure 18:
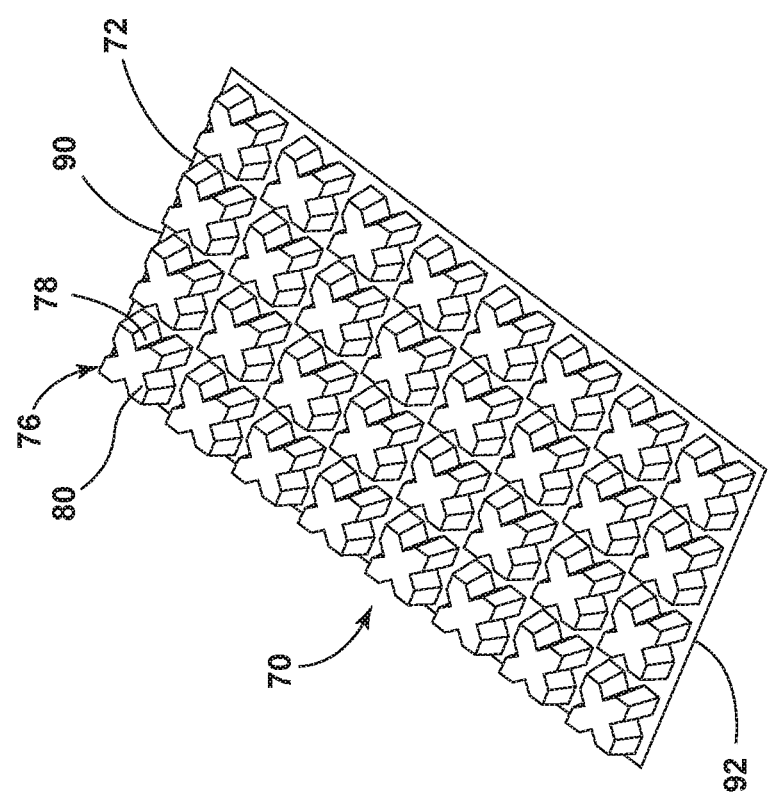
FIG. 18 illustrates another embodiment of the strengthening structure of FIG. 15 in which the relief members are tapered toward a distal end.
Figure 19:
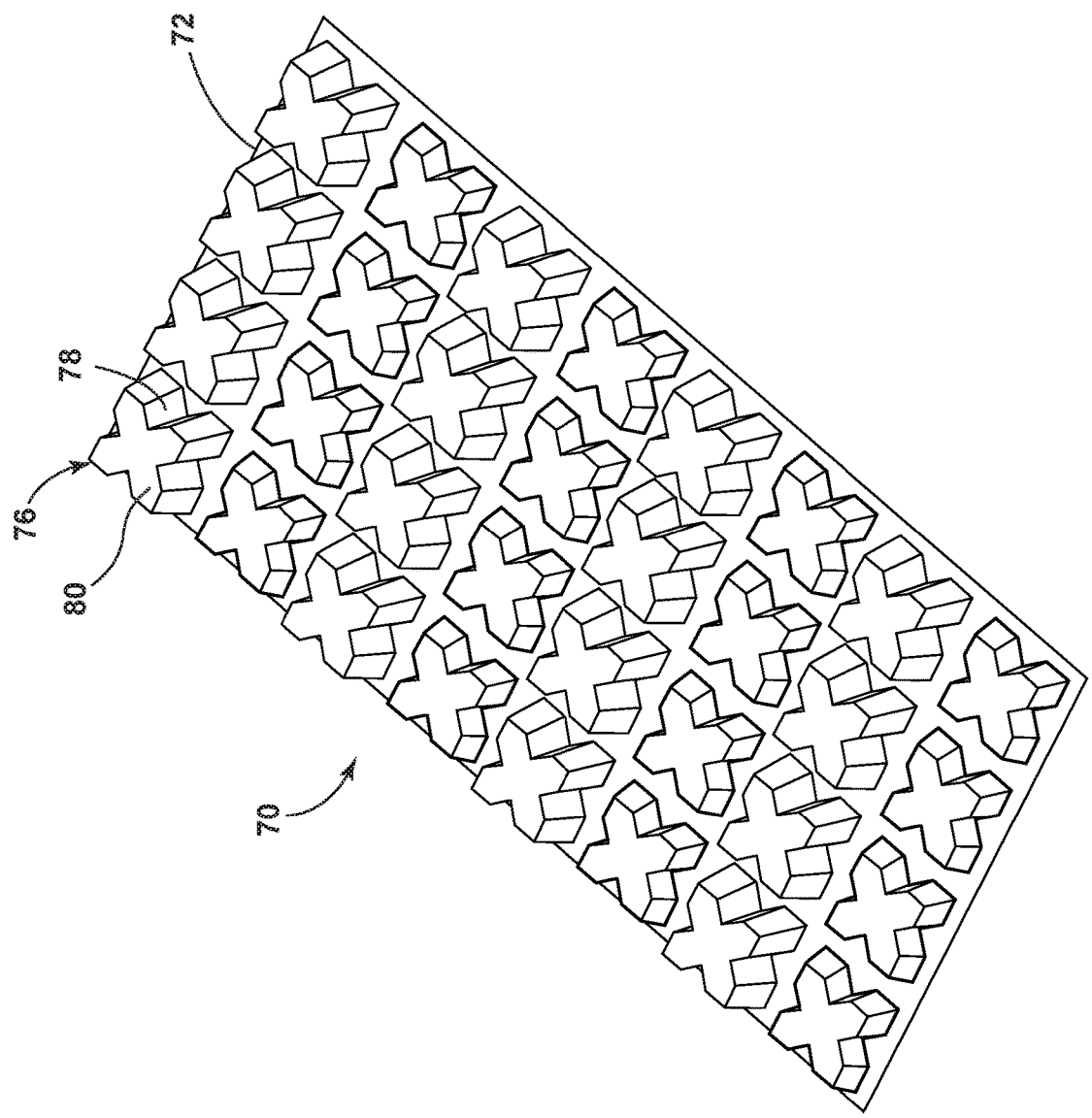
FIG. 19 illustrates another embodiment of the strengthening structure of FIG. 15 in which the relief members have variable height.

Referring now to FIGS. 15 and 16, an alternative strengthening structure is generally designated by reference numeral 70. The strengthening structure 70 includes a base 72 having a plurality of cutouts 74 and a plurality of relief members 76 extending from the base 72. The base 72 may be planar and each relief member 76 includes a sidewall 78 having a sixteen-cornered cross section, a distal end 80, and an open proximal end 82 in communication with a corresponding cutout 74. It will be understood that the strengthening structure 70 may benefit from some of the design flexibility described herein with respect to strengthening structure 10. That is, the relief members 76 may have variable height and may be variously or evenly spaced across the base 72. Additionally or alternatively, the distal end 80 of each relief member 76 may be closed, open, or partially open. In closed or partially open embodiments, it will be understood that the distal end 80 may include raised portions of varied size and shape. Additionally or alternatively still, the sidewall 78 of each relief member 76 may be uniform or tapered toward the distal end 80, as shown in FIGS. 15 and 18. Additionally or alternatively still, the base 72 may have various shapes and/or include additional cutouts free from communication with any of the relief members 76.

Figure 17:
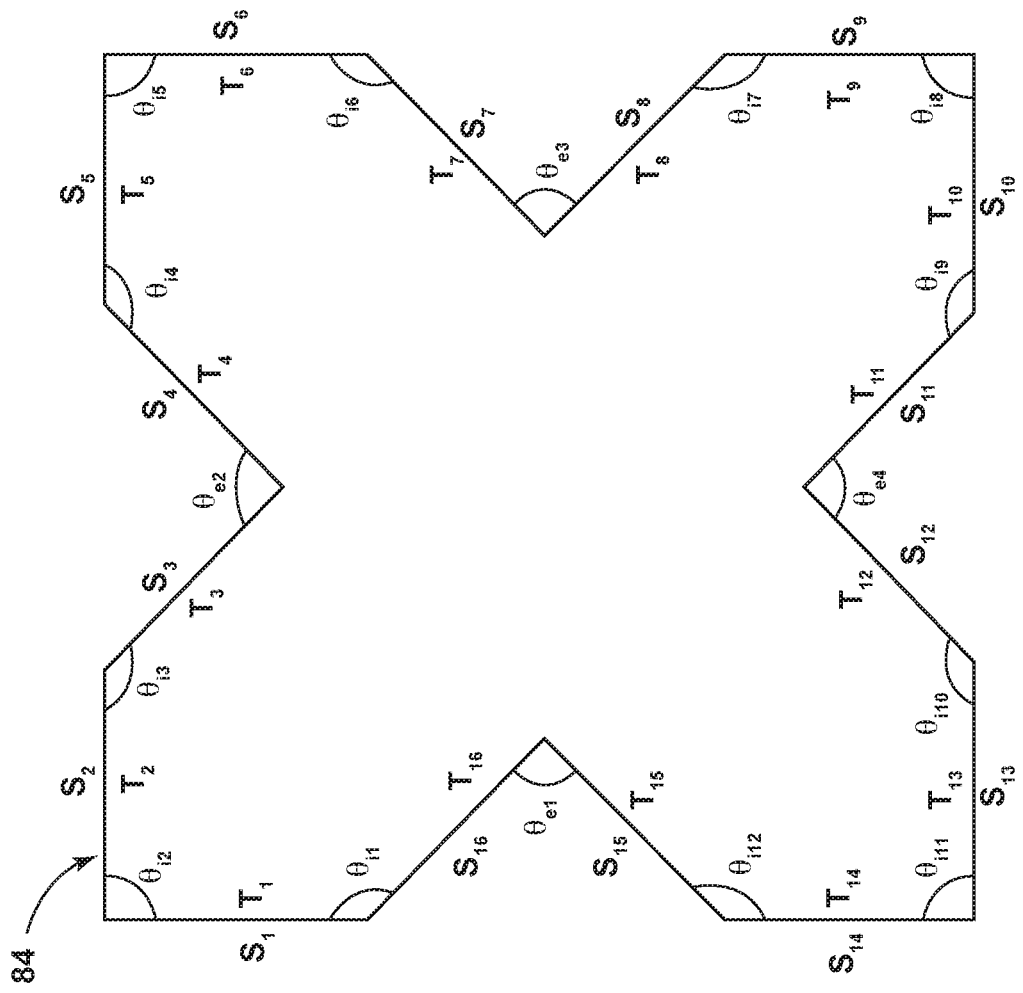
FIG. 17 illustrates a sixteen-cornered cross section of a relief member according to the embodiment of FIGS. 15 and 16.

For purposes of understanding, a cross section 84 of the sidewall 78 depicted in FIGS. 15 and 16 is shown in FIG. 17. As illustrated, the cross section 84 has lengths $S_1$-$S_{16}$, thicknesses $T_1$-$T_{16}$, twelve internal corners with angles $\theta_{i1}$-$\theta_{i12}$, and four external corners with angles $\theta_{e1}$-$\theta_{e4}$. In the illustrated embodiment, the lengths $S_1$-$S_{16}$ and thicknesses $T_1$-$T_{16}$ are about the same. Likewise, the angles associated with the internal corners are about the same and the angles $\theta_{e1}$-$\theta_{e4}$ associated with the external corners are also about the same. In certain embodiments, the lengths $S_1$-$S_{16}$, thicknesses $T_1$-$T_{16}$, and/or angles associated with the internal and/or external corners can be varied to a certain degree with available packaging space within a vehicle. While the cross section 84 is generally shown in FIG. 17 as having an outline of a cross with angular corners or an X with angular corners, it will be appreciated that other shapes are possible.

Referring to FIGS. 18-23, other embodiments of the strengthening structure 70 are shown and will be described in greater detail herein. For example, in FIG. 18, the relief members 76 are evenly spaced along the base 72 and include sidewalls 78. The relief members 76 may be arranged in rows across the base 72 from a first end 90 to a second end 92. The sidewalls 78 are generally tapered toward the distal end 80. Similarly, in FIG. 19, the relief members 76 are evenly spaced along the base 72 and include tapered sidewalls 78. However, the height of the sidewalls 78 varies row by row. It will be understood that the height of the rows may be varied different amounts, that the variations may be in the form of a pattern, or that the variations may be randomly chosen based on the location of the respective relief member 76. It will also be understood that the sidewalls 78 may be vertical, as shown in FIG. 15, while still maintaining the variation in height.

According to other examples, as shown in FIG. 20, the base 72 is planar with twelve corners and the distal end 80 of each relief member 76 is closed. It will be understood that the distal end 80 of each relief member 76 may be open or partially open without departing from the scope of the present disclosure. The relief members 76 are arranged so that a first column and a fourth column of relief members 76 are aligned and a second column and a third column of relief members 76 are aligned. The first and fourth columns of relief members 76 are offset from the second and third columns of relief members 76. In FIG. 21, the relief members 76 are evenly spaced along the base 72 and include tapered sidewalls 78 with the distal end 80 being open. The relief members 76 may be arranged in rows across the base 72 from the first end 90 to the second end 92.

In FIG. 22, the distal end 80 of each relief member 76 is partially open. An opening 96 of the distal end 80 may be of any shape including the shape of the relief member 76, a square, a circle, or triangle, for example. In FIG. 23, the distal end 80 of each relief member 76 is closed and includes a raised central portion 98 to assist in absorbing minor impact while the remaining structure functions to absorb impact that is more severe. In any of the examples described in FIGS. 18-23, the base 11 may include additional cutouts that are free from communication with any of the relief members 76, as shown in FIG. 9 with reference to alternate cross sections for the relief members 76. It will further be understood that any of the designs discussed relative to the relief members 76 may be used in combination to improve the strength characteristics of the strengthening structure 70.

Figure 25:
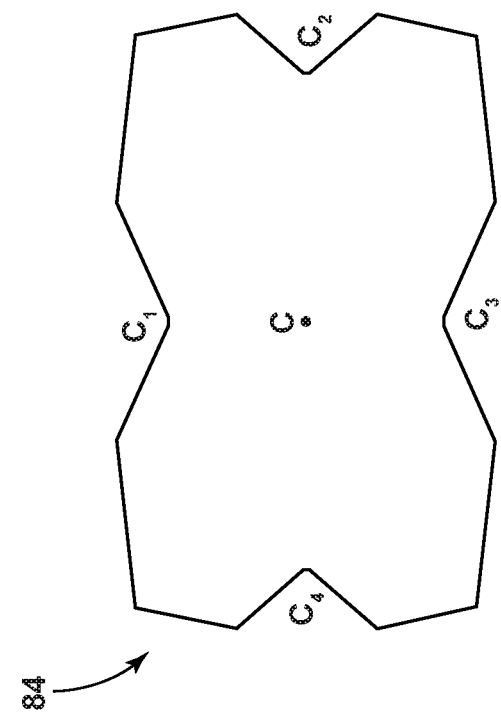
FIG. 25 illustrates another embodiment of a sixteen-cornered cross section.
Figure 24:
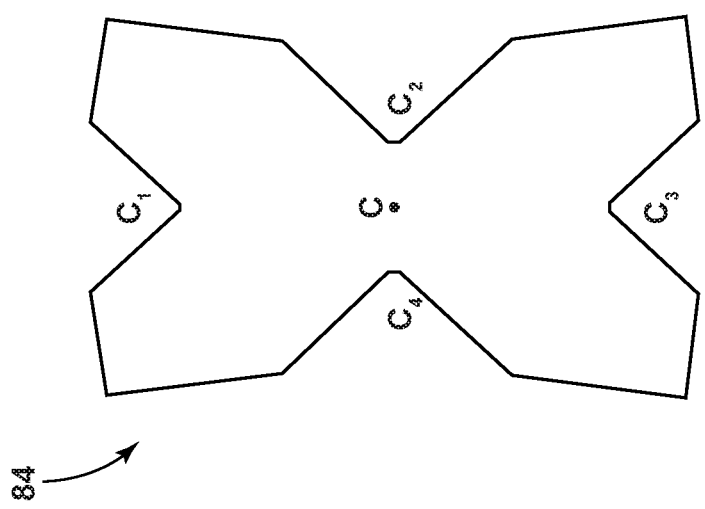
FIG. 24 illustrates another embodiment of a sixteen-cornered cross section.
Figure 26:
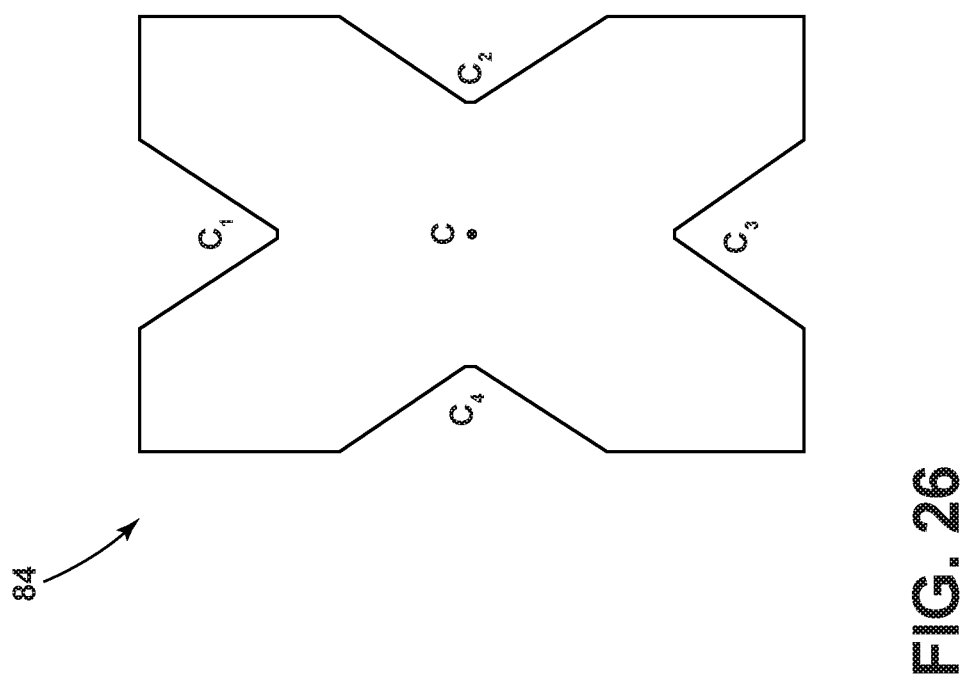
FIG. 26 illustrates another embodiment of a sixteen-cornered cross section.

While the cross section 84 is generally shown in FIG. 17 as having an outline of an X or cross with angular corners, it will be appreciated that other shapes having sixteen or more corners are possible. For example, as shown in FIGS. 24-26, upper and lower outer corners $C_1$ and $C_3$ may extend any distance towards a center point C. Similarly, laterally opposing corners $C_2$ and $C_4$ may extend any distance towards the center point C. This provides cross sections 84 of varying geometries. The variability of the length of the sides of the cross section 84 further provides varying widths and heights of the cross section 84, as shown in FIGS. 24-26.

Figure 30:
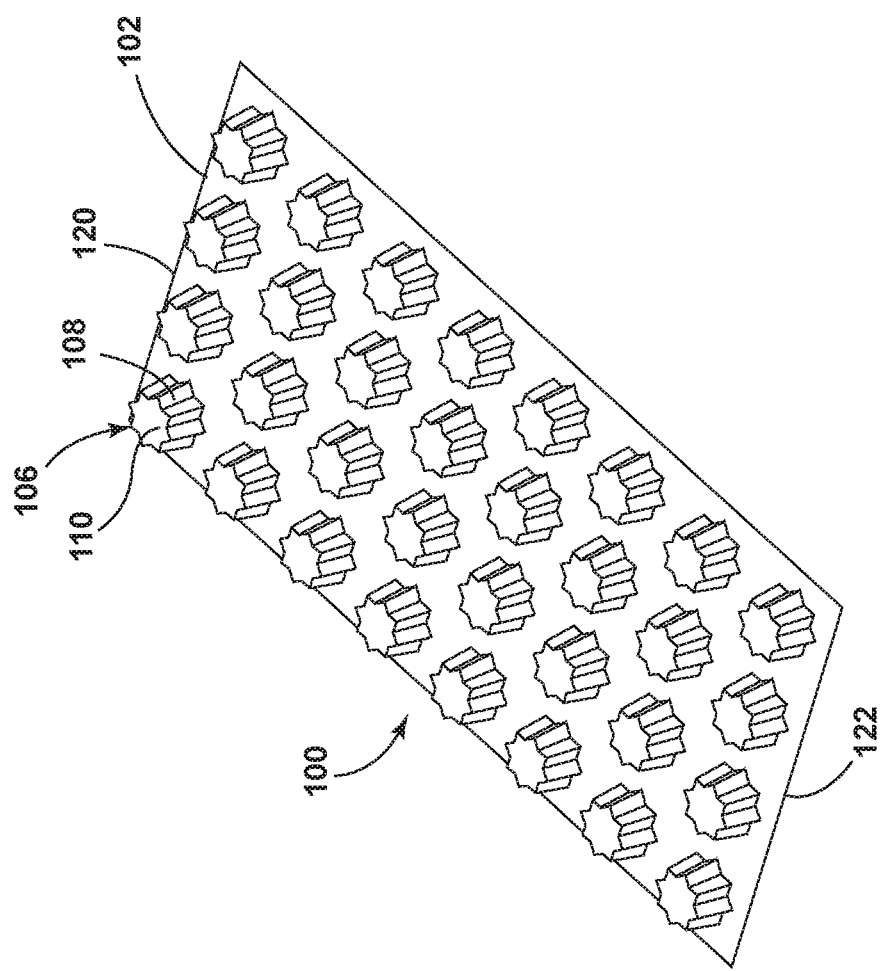
FIG. 30 illustrates another embodiment of the strengthening structure of FIG. 27 in which the relief members are tapered toward a distal end.
Figure 31:
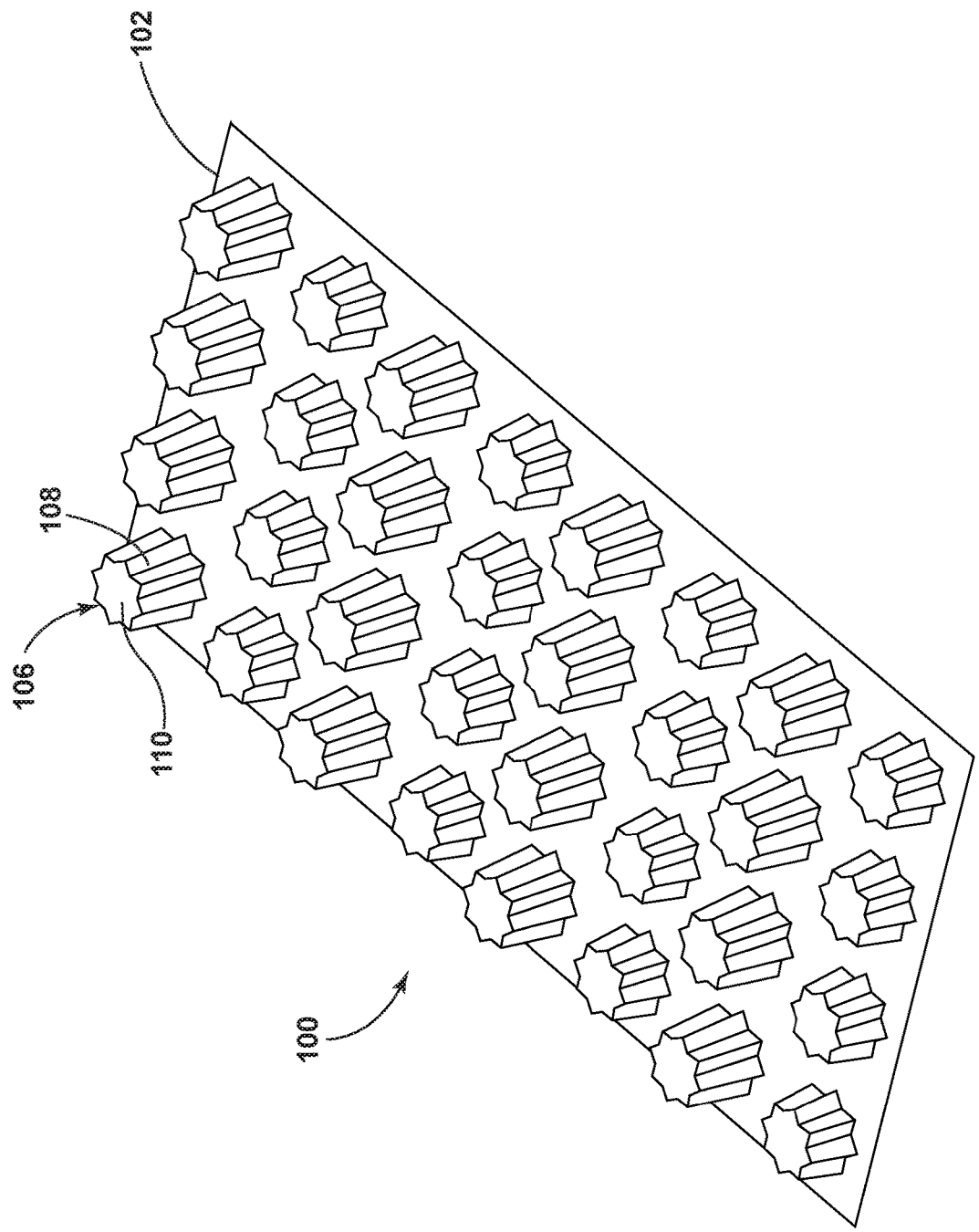
FIG. 31 illustrates another embodiment of the strengthening structure of FIG. 27 in which the relief members have variable height.

Referring now to FIGS. 27 and 28, an alternative strengthening structure is generally designated by reference numeral 100. The strengthening structure 100 includes a base 102 having a plurality of cutouts 104 and a plurality of relief members 106 extending from the base 102. The base 102 may be planar and each relief member 106 includes a sidewall 108 having a sixteen-cornered cross section, a distal end 110, and an open proximal end 112 in communication with a corresponding cutout 104. It will be understood that the strengthening structure 100 may benefit from some of the design flexibility described herein with respect to strengthening structure 10. That is, the relief members 106 may have variable height and may be variously or evenly spaced across the base 102. Additionally or alternatively, the distal end 110 of each relief member 106 may be closed, open, or partially open. In closed or partially open embodiments, it will be understood that the distal end 110 may include raised portions of varied size and shape. Additionally or alternatively still, the sidewall 108 of each relief member 106 may be uniform or tapered toward the distal end 110, as shown in FIGS. 27 and 30. Additionally or alternatively still, the base 102 may have various shapes and/or include additional cutouts free from communication with any of the relief members 106.

Figure 29:
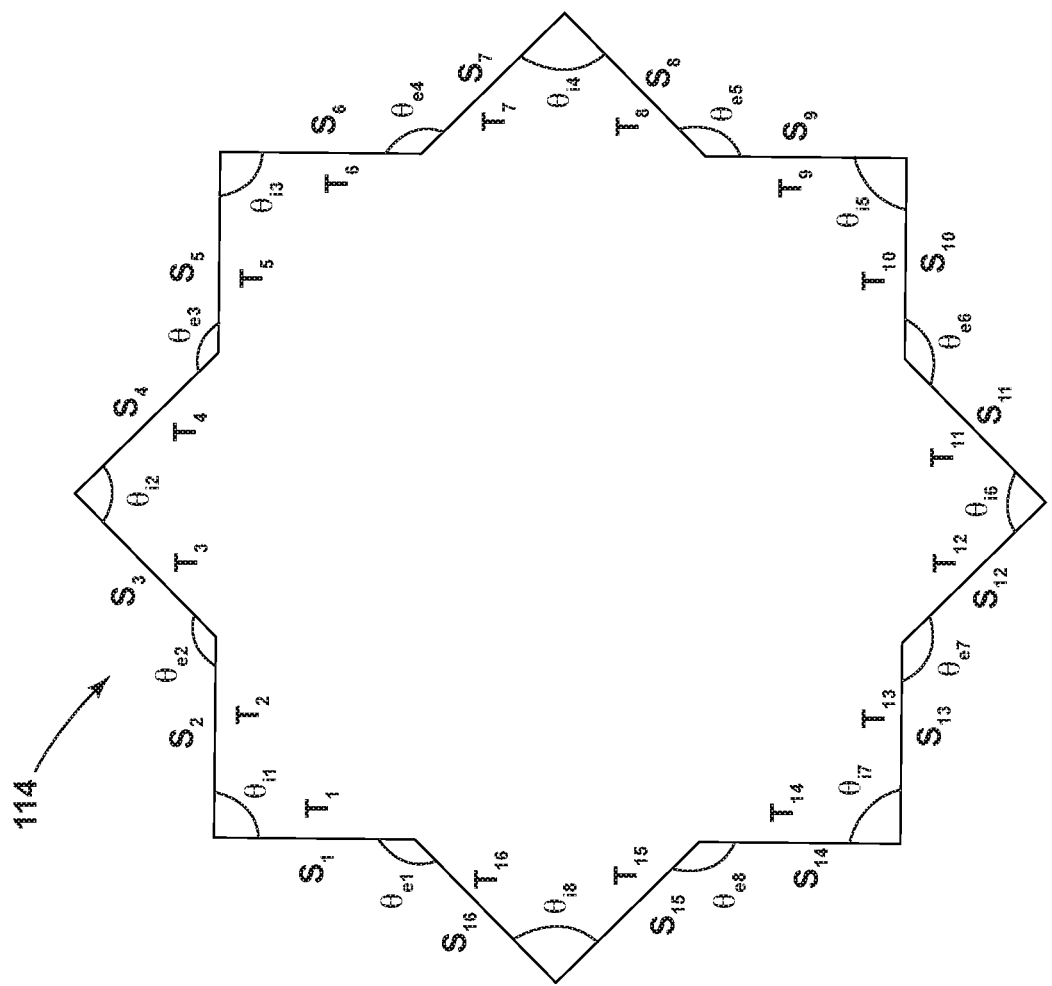
FIG. 29 illustrates a sixteen-cornered cross section of a relief member according to the embodiment of FIGS. 27 and 28.

For purposes of understanding, a cross section 114 of the sidewall 108 depicted in FIGS. 27 and 28 is shown in FIG. 29. As illustrated, the cross section 114 has lengths $S_1$-$S_{16}$, thicknesses $T_1$-$T_{16}$, eight internal corners with angles $\theta_{i1}$-$\theta_{i8}$, and eight external corners with angles $\theta_{e1}$-$\theta_{e8}$. In the illustrated embodiment, the lengths $S_1$-$S_{16}$ and thicknesses $T_1$-$T_{16}$ are about the same. Likewise, the angles $\theta_{i1}$-$\theta_{i8}$ associated with the internal corners are about the same and the angles $\theta e_1$-$\theta e_8$ associated with the external corners are also about the same. In certain embodiments, the lengths $S_1$-$S_{16}$, thicknesses $T_1$-$T_{16}$, and/or angles associated with the internal and/or external corners can be varied to a certain degree with available packaging space within a vehicle. While the cross section 114 is generally shown in FIG. 29 as having an outline of a star with eight points, it will be appreciated that other shapes are possible.

Referring to FIGS. 30-35, other embodiments of the strengthening structure 100 are shown and will be described in greater detail herein. For example, in FIG. 30, the relief members 106 are evenly spaced along the base 102 and include sidewalls 108. The relief members 106 may be arranged in rows across the base 102 from a first end 120 to a second end 122. The sidewalls 108 are generally tapered toward the distal end 110. Similarly, in FIG. 31, the relief members 106 are evenly spaced along the base 102 and include tapered sidewalls 108. However, the height of the sidewalls 108 varies row by row. It will be understood that the height of the rows may be varied different amounts, that the variations may be in the form of a pattern, or that the variations may be randomly chosen based on the location of the respective relief member 106. It will also be understood that the sidewalls 108 may be vertical, as shown in FIG. 27, while still maintaining the variation in height.

Figure 32:
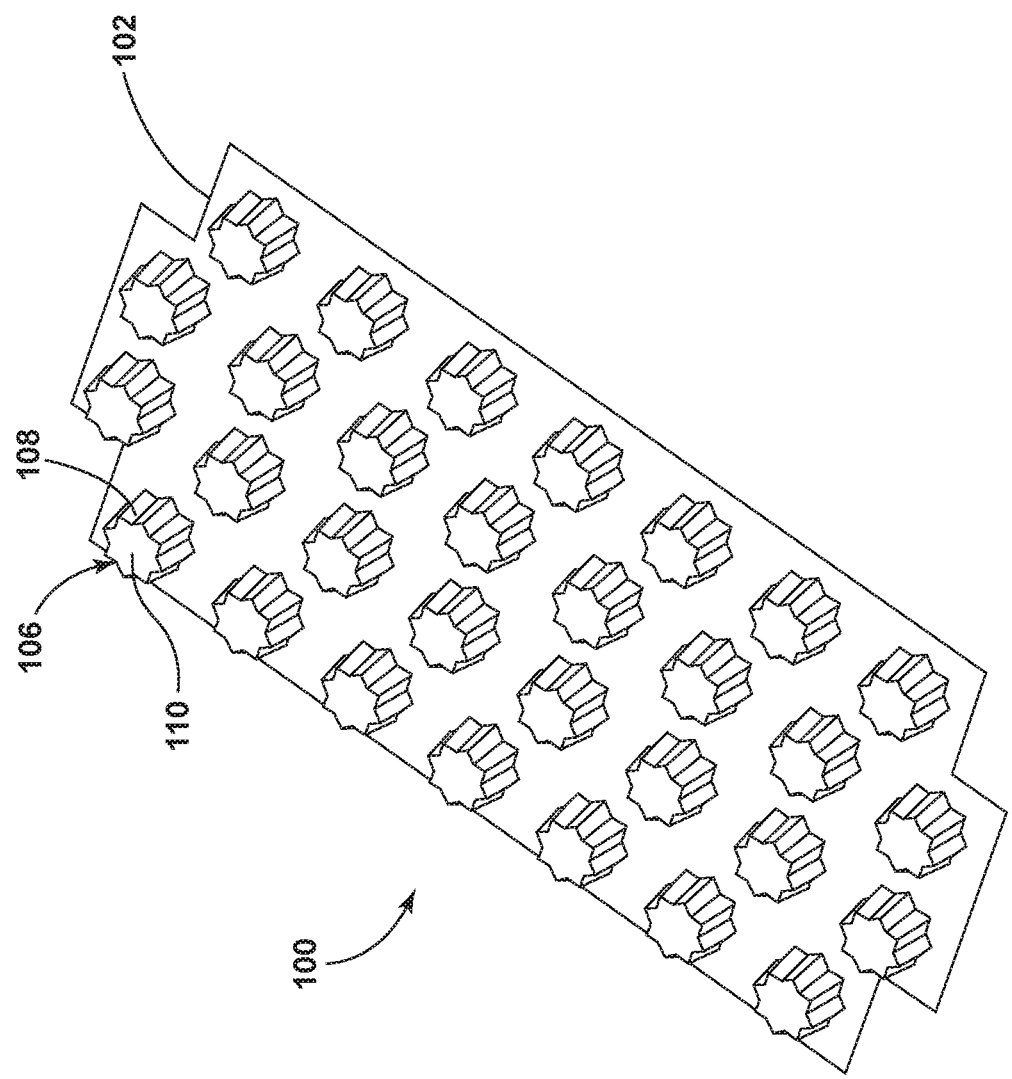
FIG. 32 illustrates another embodiment of the strengthening structure of FIG. 27 in which the relief members are offset.
Figure 33:
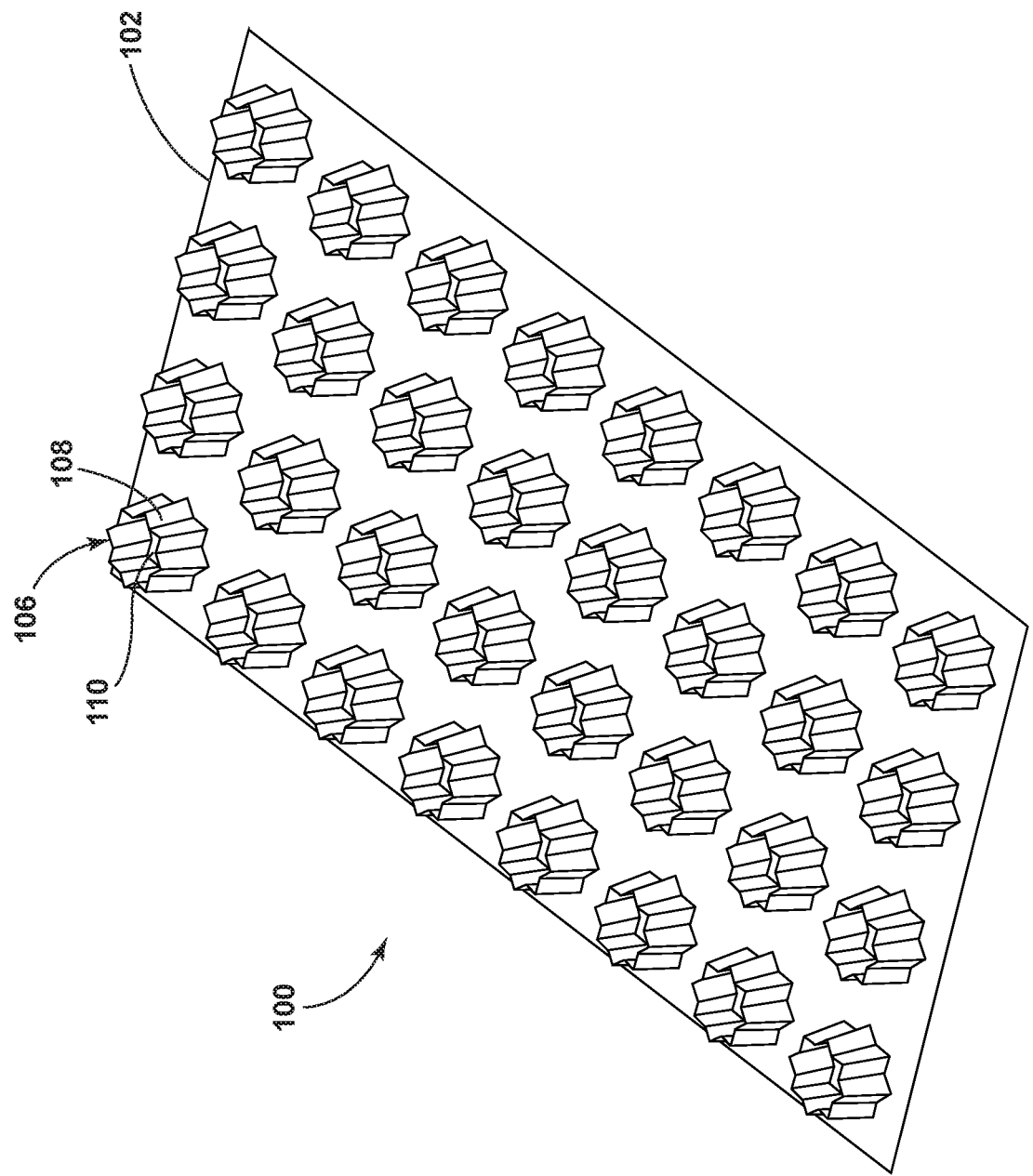
FIG. 33 illustrates another embodiment of the strengthening structure of FIG. 27 in which the relief members each include an open distal end and are coupled to a planar sixteen-cornered base.

According to other examples, as shown in FIG. 32, the base 102 is planar with twelve corners and the distal end 110 of each relief member 106 is closed. It will be understood that the distal end 110 of each relief member 106 may be open or partially open without departing from the scope of the present disclosure. The relief members 106 are arranged so that a first column and a fourth column of relief members 106 are aligned and a second column and a third column of relief members 106 are aligned. The first and fourth columns of relief members 106 are offset from the second and third columns of relief members 106. In FIG. 33, the relief members 106 are evenly spaced along the base 102 and include tapered sidewalls 108 with the distal end 110 being open. The relief members 106 may be arranged in rows across the base 102 from the first end 120 to the second end 122.

Figure 34:
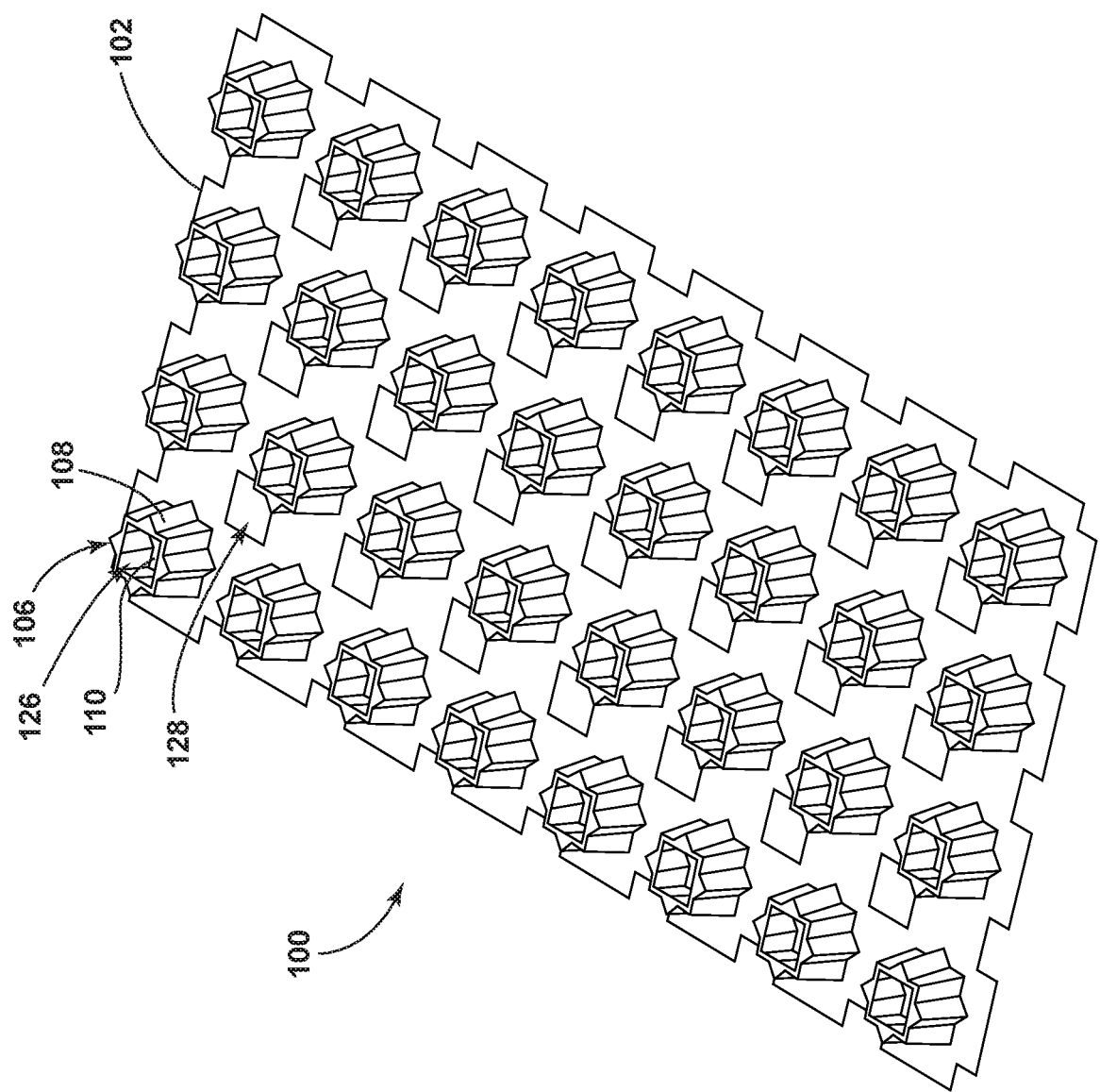
FIG. 34 illustrates another embodiment of the strengthening structure of FIG. 27 in which the relief members each include a partially open distal end and are coupled to a base having cutouts free from communication with any of the relief members
Figure 35:
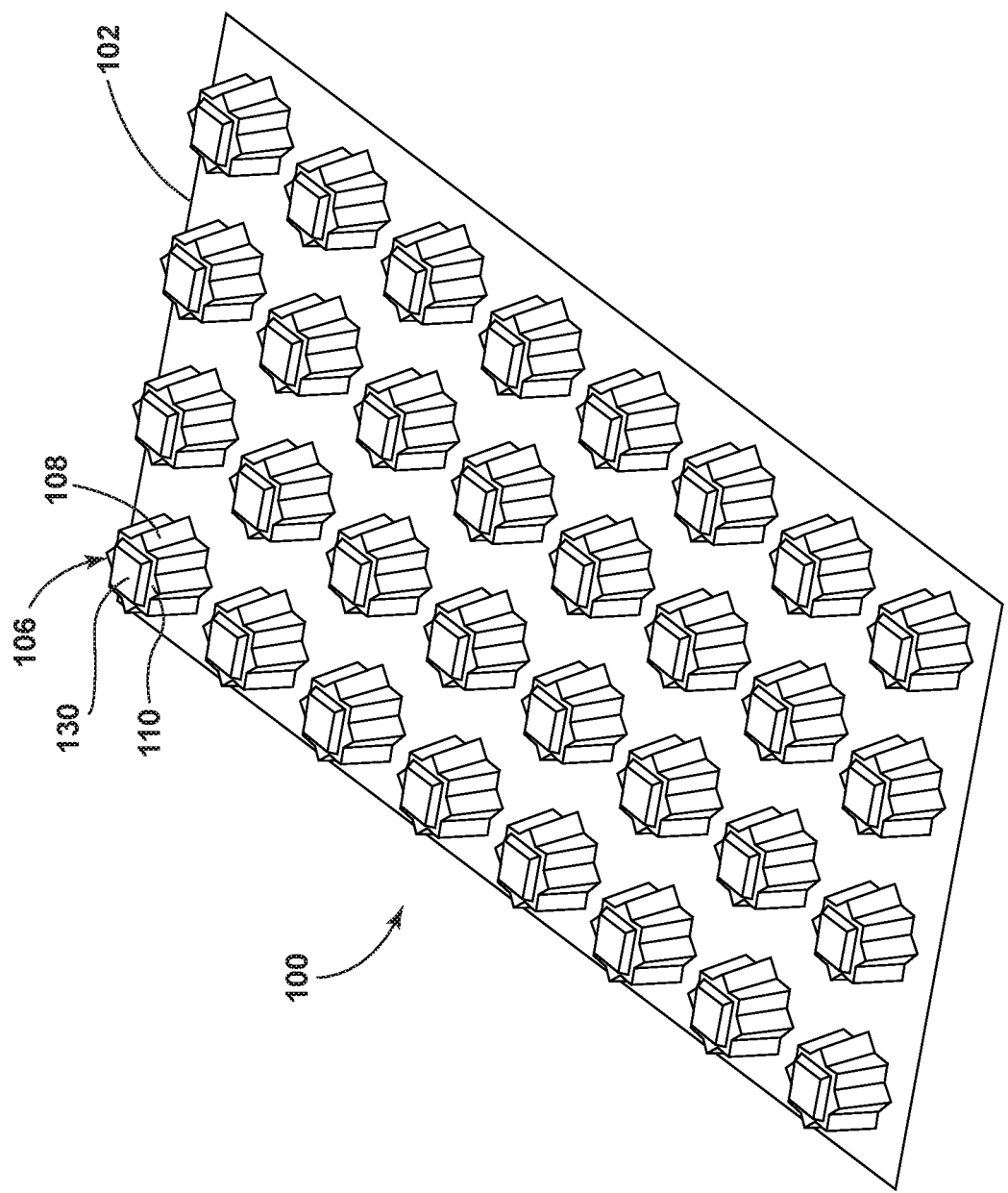
FIG. 35 illustrates another embodiment of the strengthening structure of FIG. 27 in which the relief members each include a closed distal end and a raised central portion.

In FIG. 34, the distal end 110 of each relief member 106 is partially open. An opening 126 of the distal end 110 may be of any shape including the shape of the relief member 106, a square, a circle, or triangle, for example. The base 102 may include additional cutouts 128 that are free from communication with any of the relief members 106. The additional cutouts 128 may be any shape or size to be positioned between the relief members 106. In FIG. 35, the distal end 110 of each relief member 106 is closed and includes a raised central portion 130 to assist in absorbing minor impact while the remaining structure functions to absorb impact that is more severe. It will be understood that any of the designs discussed relative to the relief members 106 may be used in combination to improve the strength characteristics of the strengthening structure 100.

Figure 36:
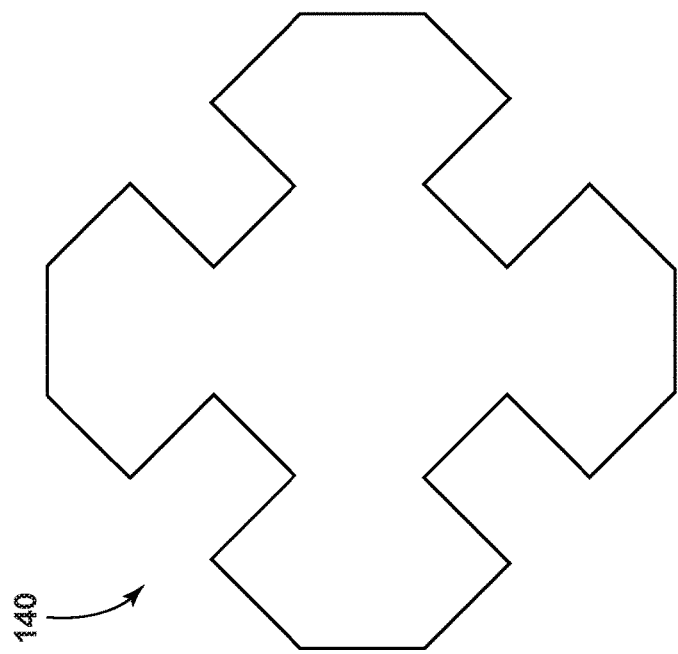
FIG. 36 illustrates an embodiment of a twenty-four-cornered cross section.
Figure 37:
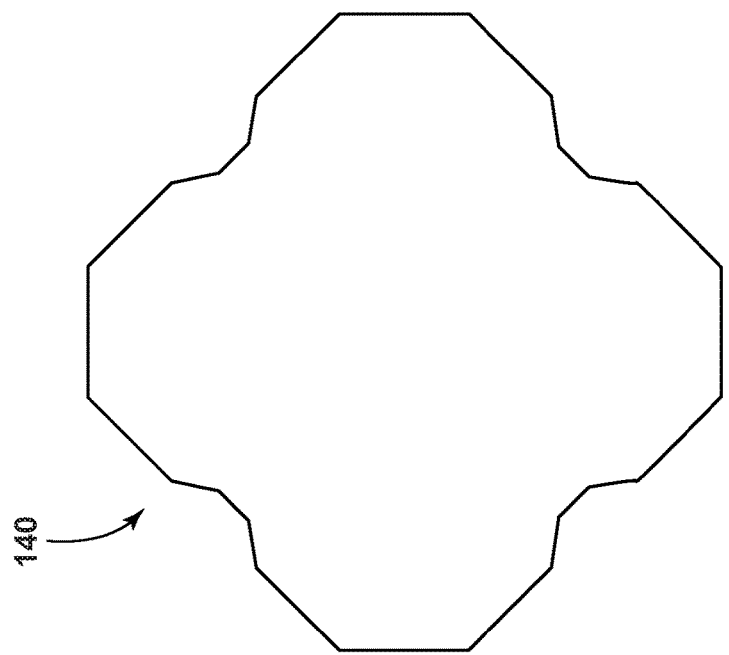
FIG. 37 illustrates another embodiment of a twenty-four-cornered cross section.
Figure 38:
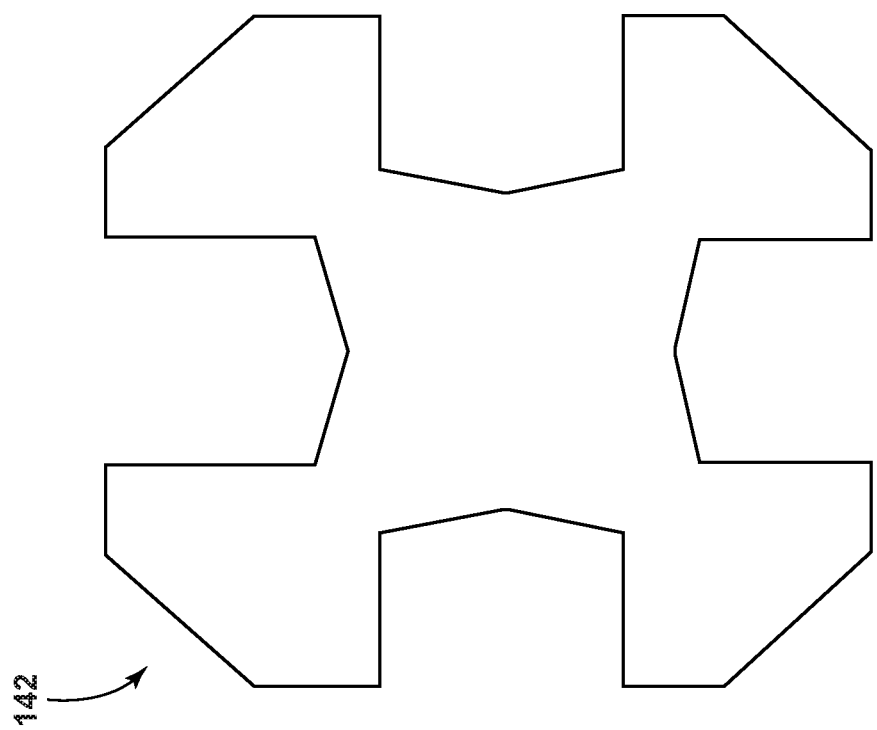
FIG. 38 illustrates an embodiment of a twenty-eight-cornered cross section.
Figure 39:
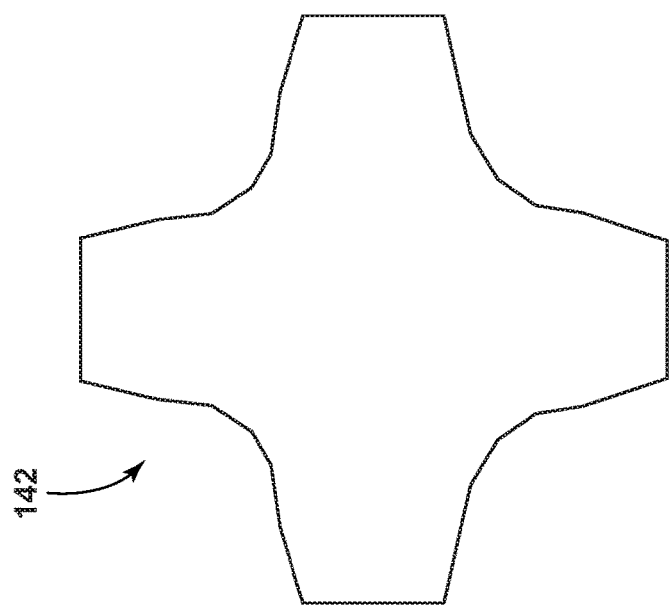
FIG. 39 illustrates another embodiment of a twenty-eight-cornered cross section.
Figure 40:
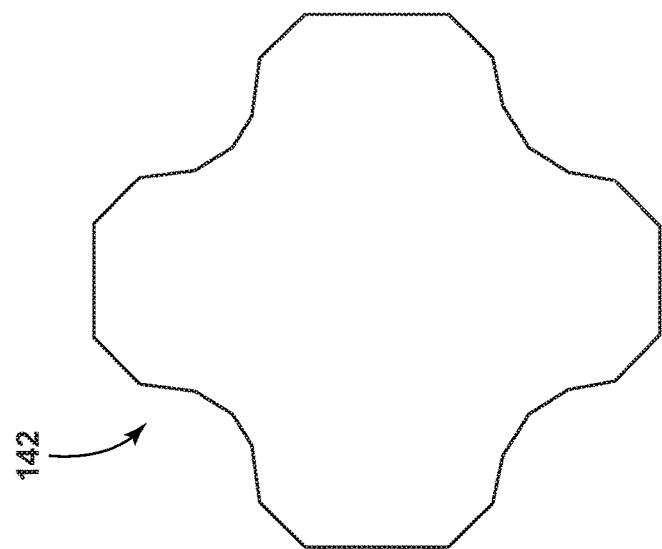
FIG. 40 illustrates another embodiment of a twenty-eight-cornered cross section.
Figure 41:
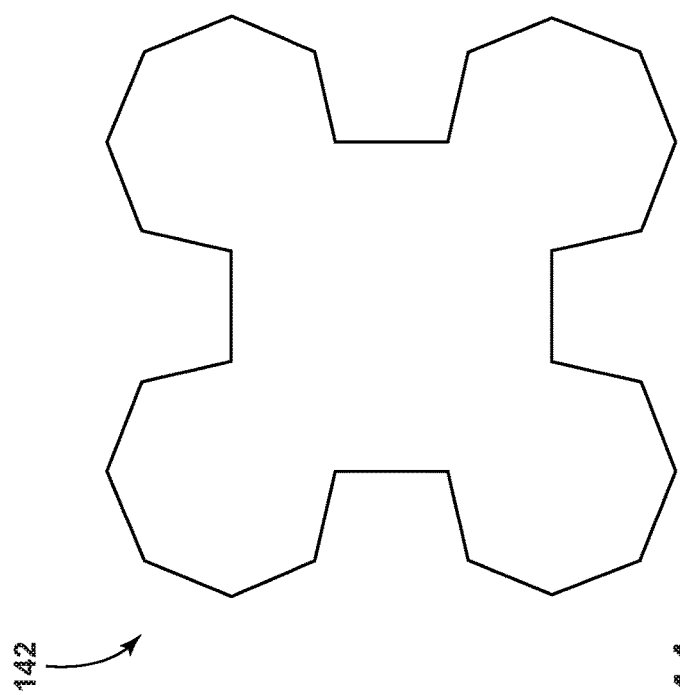
FIG. 41 illustrates another embodiment of a twenty-eight-cornered cross section.
Figure 42:
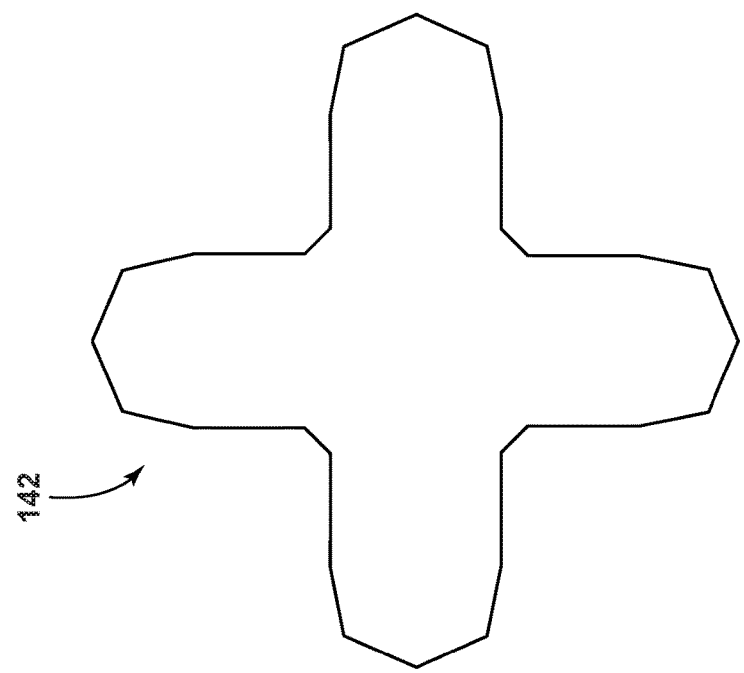
FIG. 42 illustrates another embodiment of a twenty-eight-cornered cross section.

While the cross sections 84, 114 generally shown in FIGS. 17 and 29 include sixteen corners, it will be appreciated that other shapes having eighteen or more corners are possible. It is contemplated that shapes having eighteen, twenty, twenty-two, twenty-four, twenty-six, twenty-eight, thirty, thirty-two, thirty-four, thirty-six, thirty-eight, or forty corners may be used, according to some examples. According to other examples, the cross section may include any number of corners from about four corners to about 100 corners, from about twenty corners to about 200 corners, and any combination or ranges therebetween. The geometries of the cross sections may vary to provide any number of interior and exterior angles provided that the number of interior angles and exterior angles sum to the number of corners provided. For example, as shown in FIGS. 36 and 37, a cross section 140 may be provided having twenty-four corners. According to other examples, as shown in FIGS. 38-42, a cross section 142 may be provided having twenty-eight corners and various geometries. It will be understood that relief members having any one of the cross sections shown in FIGS. 36-42 may be used as shown in FIGS. 4-9, 18-23, and 30-35.

With respect to the embodiments described herein, it will be understood that while the distal end 18, 58, 80, 110, the proximal end 20, 60, 82, 112, and the base 11, 50, 72, 102 are generally shown as planar, the foregoing components may alternatively be uneven, curved, and/or non-planar, to assist with mating, adhering, and/or joining with surrounding structures or surfaces of the vehicle. Also, it will be understood that various polygonal shapes having a plurality of corners are possible in view of the teachings provided herein. Specifically, it is contemplated that relief members 14 may be configured as dodecagons and/or stars, if desired.

Accordingly, a strengthening structure has been advantageously provided herein. The strengthening structure in accordance with the present disclosure substantially increases strength and stiffness without requiring thicker corner portions. Beneficially, the strengthening structure has a high manufacturing feasibility and can be formed in one or multiple sections by, for example, bending, rolling, stamping, pressing, drawing, hydro-forming, molding, extrusion, cutting, and forging. Sections formed in accordance with these processes can be joined via welding, adhesive, fastening, or other known joining methods.

The strengthening structure in accordance with the present disclosure is contemplated for use with a number of vehicle structures such as, but not limited to, bumper structures, door structures, hood structures, knee bolsters, roof structures, and other components benefitting from increased crash energy absorption.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements may be varied, and the nature or number of adjustment positions provided between the elements may be varied. It should be noted that the strengthening structure may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A strengthening structure of a vehicle, comprising:
a base having a first plurality of cutouts and a second plurality of cutouts;
a plurality of relief members of variable height disposed across the base, each of the relief members having one of substantially uniform sides and substantially tapered sides and including:
at least a sixteen-cornered cross section having sides of variable lengths and thicknesses;
a distal end; and
an open proximal end in communication with a corresponding cutout of the first plurality of cutouts, wherein each of the second plurality of cutouts is free from communication with any of the relief members, and further wherein each of the second plurality of cutouts defines a cutout cross-section including at least three corners.

2. The strengthening structure of claim 1, wherein the distal end is one of open, partially open, and closed.

3. The strengthening structure of claim 2, wherein the distal end is closed and includes a raised central portion.

4. The strengthening structure of claim 1, wherein the cross section includes one of sixteen corners, eighteen corners, twenty corners, twenty-two corners, twenty-four corners, twenty-six corners, and twenty-eight corners.

5. The strengthening structure of claim 1, wherein the second plurality of cutouts are defined to alternate between the relief members.

6. A strengthening structure of a vehicle, comprising:
a base having a first plurality of cutouts;
a plurality of one of uniform relief members and tapered relief members of variable height disposed across the base and each including:
a cross section having about three corners to about forty corners and having a plurality of sides of variable lengths and thicknesses;
a distal end, wherein the distal end includes a raised central portion having a perimeter wall and a central cross section having at least three corners; and
an open proximal end in communication with a corresponding cutout.

7. The strengthening structure of claim 6, wherein the distal end is open, partially open, or closed.

8. The strengthening structure of claim 7, wherein the central cross section of the raised central portion is proportional to the cross section of the respective relief member.

9. The strengthening structure of claim 6, wherein the base includes a second plurality of cutouts free from communication with any of the relief members.

10. The strengthening structure of claim 1, wherein the relief members have at least sixteen-cornered cross sections shaped as a star.

11. The strengthening structure of claim 1, wherein the relief members have at least sixteen-cornered cross sections shaped as a cross having angular ends.

* * * * *